(12) United States Patent
Zhao et al.

(10) Patent No.: US 12,192,885 B2
(45) Date of Patent: Jan. 7, 2025

(54) METHOD FOR ACCESSING NETWORK BY SMART HOME DEVICE AND RELATED DEVICE

(71) Applicant: Huawei Technologies Co., Ltd., Shenzhen (CN)

(72) Inventors: Peng Zhao, Xi'an (CN); Long Li, Shenzhen (CN); Sengui Ge, Shenzhen (CN); Jiankui Jia, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 604 days.

(21) Appl. No.: 17/419,123

(22) PCT Filed: Dec. 29, 2018

(86) PCT No.: PCT/CN2018/125765
§ 371 (c)(1),
(2) Date: Jun. 28, 2021

(87) PCT Pub. No.: WO2020/133467
PCT Pub. Date: Jul. 2, 2020

(65) Prior Publication Data
US 2022/0124607 A1 Apr. 21, 2022

(51) Int. Cl.
*H04W 48/16* (2009.01)
*H04W 48/00* (2009.01)
*H04W 48/10* (2009.01)

(52) U.S. Cl.
CPC .......... *H04W 48/16* (2013.01); *H04W 48/10* (2013.01)

(58) Field of Classification Search
CPC ...... H04W 48/16; H04W 48/10; H04W 48/00
See application file for complete search history.

(56) References Cited

U.S. PATENT DOCUMENTS

| | | | |
|---|---|---|---|
| 2013/0201866 A1 | 8/2013 | Wentink et al. | |
| 2014/0146804 A1 | 5/2014 | Seok et al. | |
| 2016/0066326 A1* | 3/2016 | Choi | H04W 72/0453 370/329 |
| 2016/0295625 A1 | 10/2016 | Zhang et al. | |

FOREIGN PATENT DOCUMENTS

| | | | | |
|---|---|---|---|---|
| CN | 102711145 A | * | 10/2012 | ............ H04L 41/00 |
| CN | 104125624 A | | 10/2014 | |
| CN | 105323826 A | | 2/2016 | |
| CN | 105407499 A | | 3/2016 | |

(Continued)

*Primary Examiner* — Jinsong Hu
*Assistant Examiner* — Farideh Madani
(74) *Attorney, Agent, or Firm* — Conley Rose, P.C.

(57) ABSTRACT

An electronic device determines an operating channel of a router, a channel range supported by the router, and a channel range supported by a smart home device. After determining that the operating channel of the router is not within the channel range supported by the smart home device, the electronic device sends an operating channel switching instruction to the router, so that an operating channel after switching is within the channel range supported by the smart home device and sends a Wi-Fi name and a password of the router to the smart home device, so that the smart home device can connect to the router by using the Wi-Fi name and the password of the router.

20 Claims, 13 Drawing Sheets

(56) References Cited

FOREIGN PATENT DOCUMENTS

| CN | 105472699 | A |   | 4/2016 |   |
|---|---|---|---|---|---|
| CN | 106535192 | A |   | 3/2017 |   |
| CN | 106604307 | A |   | 4/2017 |   |
| CN | 106961693 | A |   | 7/2017 |   |
| CN | 107426725 | A |   | 12/2017 |   |
| CN | 107454655 | A |   | 12/2017 |   |
| CN | 107613530 | A |   | 1/2018 |   |
| CN | 107801229 | A |   | 3/2018 |   |
| CN | 108012311 | A |   | 5/2018 |   |
| CN | 108200615 | A | * | 6/2018 | ............ F21V 33/00 |
| CN | 108848490 | A |   | 11/2018 |   |
| JP | 2009141671 | A |   | 6/2009 |   |
| JP | 2016158249 | A |   | 9/2016 |   |
| JP | 2017516433 | A |   | 6/2017 |   |
| WO | WO-2010051119 | A2 | * | 5/2010 | ........... H04W 48/12 |
| WO | 2014137819 | A2 |   | 9/2014 |   |

\* cited by examiner

| Element ID | Length | Country code | First channel number | Number of channels | Maximum transmit power |
|---|---|---|---|---|---|
| | | | | | |

FIG. 11

| Country | Country code | First channel number | Number of channels | Channel range |
|---|---|---|---|---|
| China | CN | 1 | 13 | [1, 13] |
| United States | US | 1 | 11 | [1, 11] |
| Europe | EU | 1 | 13 | [1, 13] |
| Japan | JP | 1 | 14 | [1, 14] |
| Australia | AU | 1 | 13 | [1, 13] |
| Venezuela | VE | 1 | 13 | [1, 13] |
| Israel | IL | 3 | 7 | [3, 9] |

FIG. 12

METHOD FOR ACCESSING NETWORK BY SMART HOME DEVICE AND RELATED DEVICE

CROSS-REFERENCE TO RELATED APPLICATIONS

This is a U.S. National Stage of International Patent Application No. PCT/CN2018/125765 filed on Dec. 29, 2018, which is hereby incorporated by reference in its entirety.

TECHNICAL FIELD

This application relates to the field of smart home technologies, and in particular, to a method for accessing a network by a smart home device and a related device.

BACKGROUND

With the continuous development of internet of things technologies, smart home devices become more popular, smart home systems are more widely applied, and more smart home devices are in users homes. A smart home device can connect to the interact through a router, and a user may remotely control the smart home device through a mobile phone. The wide application of the smart home systems provides users with a more convenient and comfortable home life.

However, if an operating channel of the router is not within a channel range supported by the smart home device, the smart home device cannot access a network. In the related art, the foregoing problem can be resolved by using the following two solutions: 1. The user manually adjusts the operating channel of the router, so that the operating channel of the router is within the channel range supported by the smart home device; and 2. the user restarts the router, so that the router reselects an operating channel.

The foregoing two solutions have complex operations and cannot ensure that the adjusted operating channel of the router is within the channel range supported by the smart home device. Therefore, how to enable a smart home device to quickly access a network is an urgent problem to be resolved.

SUMMARY

Embodiments of this application provide a method for accessing a network by a smart home device, so that the smart home device can quickly access a network.

According to a first aspect, an embodiment of this application provides an electronic device, including one or more processors, a memory and a wireless communications module. The memory and the wireless communications module are coupled to the one or more processors, the memory is configured to store computer program code, the computer program code includes computer instructions, and the one or more processors execute the computer instructions to: determine an operating channel of a router and a channel range supported by the router; determine a channel range supported by a smart home device; after it is determined that the operating channel of the router is not within the channel range supported by the smart home device, send an operating channel switching instruction to the router, so that an operating channel obtained through switching by the router is within the channel range supported by the smart home device, where the channel switching instruction carries the channel range supported by the smart home device; and the operating channel obtained through switching by the router is within the channel range supported by the router; and send a Wi-Fi name and a password of the router to the smart home device, so that the smart home device connects to the router by using the Wi-Fi name and the password of the router.

Possibly, the wireless communications module may be a wireless fidelity (wireless fidelity, Wi-Fi) module.

In this embodiment of this application, the electronic device may determine whether the operating channel of the router is within the channel range supported by the smart device, and if the operating channel is not within the channel range, send the operating channel switching instruction to the router, so that the operating channel obtained through switching is within the channel range supported by the smart home device, and the smart home device can quickly connect to a network without affecting user experience.

In a possible implementation, the determining an operating channel of a router and a channel range supported by the router includes: receiving a beacon frame broadcast by the router; determining that a channel for receiving the beacon frame is the operating channel of the router; and determining, based on a country field or a vendor specific field in the beacon frame, the channel range supported by the router.

Specifically, a sending period of the beacon frame may be 100 milliseconds, 200 milliseconds, or the like. A longer sending period of the beacon frame indicates a longer sleep period of the router 200, and that more energy is saved. A smaller sending period of the beacon frame indicates that a shorter time is consumed by the device to find the router.

Specifically, the country field in the beacon frame may carry at least information such as an element ID, a length, a country code, a first channel number, the number of channels, and a maximum transmit power.

Specifically, a channel for receiving the beacon frame by the electronic device is an operating channel of the router.

Specifically, the country code in the country field may indicate a channel range supported by the router.

Specifically, the first channel number and the number of channels in the country field may indicate a channel range supported by the router.

In a possible implementation, the determining an operating channel of a router and a channel range supported by the router includes: receiving a probe response frame sent by the router; determining that a channel for receiving the probe response frame is the operating channel of the router; and determining, based on a country field or a vendor specific field in the probe response frame, the channel range supported by the router.

In a possible implementation, the determining a channel range supported by the smart home device includes: receiving a beacon frame broadcast by the smart home device; and determining, based on a country field or a vendor specific field in the beacon frame, the channel range supported by the smart home device.

In a possible implementation, the determining a channel range supported by the smart home device includes: receiving a probe response frame broadcast by the smart home device; and determining, based on a country field or a vendor specific field in the probe response frame, the channel range supported by the smart home device.

In a possible implementation, before the sending a Wi-Fi name and a password of the router to the smart home device, the processor is further configured to connect to the smart home device.

In this embodiment of this application, the electronic device can connect to the smart home device, and send the Wi-Fi name and the password of the router to the smart home device.

In a possible implementation, the sending a Wi-Fi name and a password of the router to the smart home device includes: sequentially broadcasting, on each channel supported by the electronic device, information about the Wi-Fi name and the password of the router, where the information carries identification information of the smart home device, so that the smart home device sequentially receives the information in a polling mode in the channel range supported by the smart home device, determines whether the identification information is correct, and if the identification information is correct, obtains the name and the password of the router from the information.

Specifically, the Wi-Fi name and the password of the router may be carried in a data frame, and there may be one or more data frames.

In this embodiment of this application, the electronic device may send the Wi-Fi name and the password of the router to the smart home device without connecting to the smart home device. The electronic device may always be connected to the router, and data transmission between the electronic device and the router is not affected.

According to a second aspect, an embodiment of this application provides a smart home system, including an electronic device, a router, and a smart home device. The electronic device is configured to: determine an operating channel of the router and a channel range supported by the router; determine a channel range supported by the smart home device; and after it is determined that the operating channel of the router is not within the channel range supported by the smart home device, send an operating channel switching instruction to the router, where the operating channel switching instruction carries the channel range supported by the smart home device. The router is configured to receive the operating channel switching instruction, and switch the operating channel, where an operating channel obtained through switching is within the channel range supported by the smart home device, and the operating channel obtained through switching is within the channel range supported by the router. The electronic device is further configured to send a Wi-Fi name and a password of the router to the smart home device. The smart home device is configured to connect to the router by using the Wi-Fi name and the password of the router.

In this embodiment of this application, the electronic device may determine whether the operating channel of the router is within the channel range supported by the smart device, and if the operating channel is not within the channel range, send the operating channel switching instruction to the router, so that the operating channel obtained through switching is within the channel range supported by the smart home device, and the smart home device can quickly connect to a network without affecting user experience.

In a possible implementation, that the electronic device is configured to determine an operating channel of the router and a channel range supported by the router includes: receiving a beacon frame broadcast by the router; determining that a channel for receiving the beacon frame is the operating channel of the router; and determining, based on a country field or a vendor specific field in the beacon frame, the channel range supported by the router.

Specifically, a sending period of the beacon frame may be 100 milliseconds, 200 milliseconds, or the like. A longer sending period of the beacon frame indicates a longer sleep period of the router 200, and that more energy is saved. A smaller sending period of the beacon frame indicates that a shorter time is consumed by the device to find the router.

Specifically, the country field in the beacon frame may carry at least information such as an element ID, a length, a country code, a first channel number, the number of channels, and a maximum transmit power.

Specifically, a channel for receiving the beacon frame by the electronic device is an operating channel of the router.

Specifically, the country code in the country field may indicate a channel range supported by the router.

Specifically, the first channel number and the number of channels in the country field may indicate a channel range supported by the router.

In a possible implementation, that the electronic device is configured to determine an operating channel of the router and a channel range supported by the router includes: receiving a probe response frame sent by the router; determining that a channel for receiving the probe response frame is the operating channel of the router; and determining, based on a country field or a vendor specific field in the probe response frame, the channel range supported by the router.

In a possible implementation, that the electronic device is configured to determine a channel range supported by the smart home device includes: receiving a beacon frame broadcast by the smart home device; and determining, based on a country field or a vendor specific field in the beacon frame, the channel range supported by the smart home device.

In a possible implementation, that the electronic device is configured to determine a channel range supported by the smart home device includes: receiving a probe response frame broadcast by the smart home device; and determining, based on a country field or a vendor specific field in the probe response frame, the channel range supported by the smart home device.

In a possible implementation, the electronic device is further configured to: before sending the Wi-Fi name and the password of the router to the smart home device, the electronic device is further configured to connect to the smart home device.

In this embodiment of this application, the electronic device can connect to the smart home device, and send the Wi-Fi name and the password of the router to the smart home device.

In a possible implementation, that the electronic device is further configured to send a Wi-Fi name and a password of the router to the smart home device includes: sequentially broadcasting, on each channel supported by the electronic device, information about the Wi-Fi name and the password of the router, where the information carries identification information of the smart home device, so that the smart home device sequentially receives the information in a polling mode in the channel range supported by the smart home device, determines whether the identification information is correct, and if the identification information is correct, obtains the name and the password of the router from the information.

Specifically, the Wi-Fi name and password of the router may be carried in a data frame, and there may be one or more data frames.

In this embodiment of this application, the electronic device may send the Wi-Fi name and the password of the router to the smart home device without connecting to the smart home device. The electronic device may always be connected to the router, and data transmission between the electronic device and the router is not affected.

According to a third aspect, an embodiment of this application provides a router, applied to a smart home system, where the smart home system includes the router, an electronic device, and a smart home device, and the router includes one or more processors, a memory, and a wireless communications module. The memory and the wireless communications module are coupled to the one or more processors, the memory is configured to store computer program code, the computer program code includes computer instructions, and the one or more processors execute the computer instructions to: broadcast, on an operating channel of the router, a channel range supported by the router; receive an operating channel switching instruction sent by the electronic device, where the operating channel switching instruction carries a channel range supported by the smart home device, and the operating channel switching instruction is an instruction sent after the electronic device determines that the operating channel of the router is not within the channel range supported by the smart home device; determine, by the router, a channel whose signal-to-noise ratio is higher than a first threshold as a target operating channel, where the target operating channel is within the channel range supported by the smart home device, and the target operating channel is within the channel range supported by the router; and switch, by the router, the operating channel to the target operating channel.

Possibly, the wireless communications module may be a Wi-Fi module.

The router provided in this embodiment of this application may receive the operating channel switching instruction sent by the electronic device, and switch the operating channel to the channel range supported by the smart home device, so that the smart home device can quickly connect to a network without affecting user experience.

According to a fourth aspect, an embodiment of this application provides an electronic device, including one or more processors, a memory, and a wireless communications module. The memory and the wireless communications module are coupled to the one or more processors, the memory is configured to store computer program code, the computer program code includes computer instructions, and the one or more processors execute the computer instructions to: determine an operating channel of a router; determine a channel range supported by a smart home device; after it is determined that the operating channel of the router is not within the channel range supported by the smart home device, send a channel range extension instruction to the smart home device, so that a channel range changed by the smart home device includes the operating channel of the router, where the channel range extension instruction includes the operating channel of the router; and send a Wi-Fi name and a password of the router to the smart home device, so that the smart home device connects to the router by using the Wi-Fi name and the password of the router.

Possibly, the wireless communications module may be a Wi-Fi module.

In this embodiment of this application, the electronic device may determine whether the operating channel of the router is within the channel range supported by the smart device, and if the operating channel of the router is not within the channel range, send the channel range extension instruction to the smart home device, so that an extended channel range may include the operating channel of the router, and the smart home device can quickly connect to a network without affecting user experience.

According to a fifth aspect, an embodiment of this application provides a smart home device, applied to a smart home system. The smart home system includes a router, an electronic device, and the smart home device, and the smart home device includes one or more processors, a memory, and a wireless communications module. The memory and the wireless communications module are coupled to the one or more processors, the memory is configured to store computer program code, the computer program code includes computer instructions, and the one or more processors execute the computer instructions to: broadcast a channel range supported by the smart home device; receive a channel range extension instruction sent by the electronic device, where the channel range extension instruction carries an operating channel of the router; and the channel range extension instruction is an instruction sent by the electronic device after the electronic device determines that the operating channel of the router is not within the channel range supported by the smart home device; and extend a channel range based on the operating channel of the router, where a changed channel range includes the operating channel of the router.

Possibly, the wireless communications module may be a Wi-Fi module.

In a possible implementation, the channel range extension instruction sent by, the electronic device to the smart home device may carry a country code (for example, CN) and a channel range (for example, channel 1 to channel 13) that are supported by the router. After receiving the channel extension instruction, the smart home device changes a country code of the smart home device to the country code (for example, CN) supported by the router, and changes the channel range supported by the smart home device to the channel range (for example, channel 1 to channel 13) supported by the router.

The smart home device provided in this embodiment of this application may receive the channel range extension instruction sent by the electronic device, and extend the channel range supported by the smart home device to be capable of including the operating channel of the router, so that the smart home device can quickly connect to a network without affecting user experience.

According to a sixth aspect, an embodiment of this application provides a method for accessing a network by a smart home device, including: determining an operating channel of a router and a channel range supported by the router; determining a channel range supported by the smart home device; after it is determined that the operating channel of the router is not within the channel range supported by, the smart home device, sending an operating channel switching instruction to the router, so that an operating channel obtained through switching by the router is within the channel range supported by the smart home device, where the channel switching instruction carries the channel range supported by the smart home device; and sending a Wi-Fi name and a password of the router to the smart home device, so that the smart home device connects to the router by using a Wi-Fi name and a password of the router.

In this embodiment of this application, the electronic device may determine whether the operating channel of the router is within the channel range supported by the smart device, and if the operating channel is not within a channel range, send the operating channel switching instruction to the router, so that the operating channel obtained through switching is within the channel range supported by the smart home device, and the smart home device can quickly connect to a network without affecting user experience.

In a possible implementation, the determining an operating channel of a router and a channel range supported by the router includes: receiving a beacon frame broadcast by the router; determining that a channel for receiving the beacon frame is the operating channel of the router; and determining, based on a country field or a vendor specific field in the beacon frame, the channel range supported by the router.

Specifically, a sending period of the beacon frame may be 100 milliseconds, 200 milliseconds, or the like. A longer sending period of the beacon frame indicates a longer sleep period of the router 200, and that more energy is saved. A smaller sending period of the beacon frame indicates that a shorter time is consumed by the device to find the router.

Specifically, the country field in the beacon frame may carry at least information such as an element ID, a length, a country code, a first channel number, the number of channels, and a maximum transmit power.

Specifically, a channel for receiving the beacon frame by the electronic device is an operating channel of the router.

Specifically, the country code in the country field may indicate a channel range supported by the router.

Specifically, the first channel number and the number of channels in the country field may indicate a channel range supported by the router.

In a possible implementation, the determining an operating channel of a router and a channel range supported by the router includes: receiving a probe response frame sent by the router; determining that a channel for receiving the probe response frame is the operating channel of the router; and determining, based on a country field or a vendor specific field in the probe response frame, the channel range supported by the router.

In a possible implementation, the determining a channel range supported by the smart home device includes: receiving a beacon frame broadcast by the smart home device; and determining, based on a country field or a vendor specific field in the beacon frame, the channel range supported by the smart home device.

In a possible implementation, the determining a channel range supported by the smart home device includes: receiving a probe response frame broadcast by the smart home device; and determining, based on a country field or a vendor specific field in the probe response frame, the channel range supported by the smart home device.

In a possible implementation, before the sending a Wi-Fi name and a password of the router to the smart home device, the method further includes: connecting to the smart home device.

In this embodiment of this application, the electronic device can connect to the smart home device, and send the Wi-Fi name and the password of the router to the smart home device.

In a possible implementation, the sending a Wi-Fi name and a password of the router to the smart home device includes: sequentially broadcasting, on each channel supported by the electronic device, information about the Wi-Fi name and the password of the router, where the information carries identification information of the smart home device, so that the smart home device sequentially receives the information in a polling mode in the channel range supported by the smart home device, determines whether the identification information is correct, and if the identification information is correct, obtains the Wi-Fi name and the password of the router from the information.

Specifically, the Wi-Fi name and the password of the router may be carried in a data frame, and there may be one or more data frames.

In this embodiment of this application, the electronic device may send the Wi-Fi name and the password of the router to the smart home device without connecting to the smart home device. The electronic device may always be connected to the router, and data transmission between the electronic device and the router is not affected.

According to a seventh aspect, an embodiment of this application provides a computer storage medium, including computer instructions. When the computer instructions are run on an electronic device, the electronic device performs the method for accessing a network by a smart home device according to the sixth aspect or any one of the possible implementations of the sixth aspect of the embodiments of this application.

According to an eighth aspect, an embodiment of this application provides a computer program product. When the computer program product is run on an electronic device, the electronic device performs the method for accessing a network by a smart home device according to the sixth aspect or any one of the possible implementations of the sixth aspect of the embodiments of this application.

It may be understood that both the computer storage medium according to the seventh aspect and the computer program product according to the eighth aspect are configured to perform the method for accessing a network by a smart home device according, to the sixth aspect. Therefore, for beneficial effects that can be achieved, refer to beneficial effects in the method for accessing a network by a smart home device according to the sixth aspect. Details are not described herein again.

According to a ninth aspect, an embodiment of this application provides a method for accessing a network by a smart home device, including: determining an operating channel of a router; determining a channel range supported by the smart home device; after it is determined that the operating channel of the router is not within the channel range supported by the smart home device, sending a channel range extension instruction to the smart home device, so that a channel range changed by the smart home device includes the operating channel of the router, where the channel range extension instruction includes the operating channel of the router; and sending a Wi-Fi name and a password of the router to the smart home device, so that the smart home device connects to the router by using the Wi-Fi name and the password of the router.

In this embodiment of this application, the electronic device may determine whether the operating channel of the router is within the channel range supported by the smart device, and if the operating channel of the router is not within the channel range, send the channel range extension instruction to the smart home device, so that an extended channel range may include the operating channel of the router, and the smart home device can quickly connect to a network without affecting user experience.

In a possible implementation, the determining an operating channel of a router and a channel range supported by the router includes: receiving a beacon frame broadcast by the router; determining that a channel for receiving the beacon frame is the operating channel of the router; and determining, based on a country field or a vendor specific field in the beacon frame, the channel range supported by the router.

Specifically, a sending period of the beacon frame may be 100 milliseconds, 200 milliseconds, or the like. A longer sending period of the beacon frame indicates a longer sleep period of the router 200, and that more energy is saved. A smaller sending period of the beacon frame indicates that a shorter time is consumed by the device to find the router.

Specifically, the country field in the beacon frame may carry at least information such as an element ID, a length, a country code, a first channel number, the number of channels, and a maximum transmit power.

Specifically, a channel for receiving the beacon frame by the electronic device is an operating channel of the router.

Specifically, the country code in the country field may indicate a channel range supported by the router.

Specifically, the first channel number and the number of channels in the country field may indicate a channel range supported by the router.

In a possible implementation, the determining an operating channel of a router and a channel range supported by the router includes: receiving a probe response frame sent by the router; determining that a channel for receiving the probe response frame is the operating channel of the router; and determining, based on a country field or a vendor specific field in the probe response frame, the channel range supported by the router.

In a possible implementation, the determining a channel range supported by the smart home device includes: receiving a beacon frame broadcast by the smart home device; and determining, based on a country field or a vendor specific field in the beacon frame, the channel range supported by the smart home device.

In a possible implementation, the determining a channel range supported by the smart home device includes: receiving a probe response frame broadcast by the smart home device; and determining, based on a country field or a vendor specific field in the probe response frame, the channel range supported by the smart home device.

In a possible implementation, before the sending a Wi-Fi name and a password of the router to the smart home device, the method further includes: connecting to the smart home device.

In this embodiment of this application, the electronic device can connect to the smart home device, and send the Wi-Fi name and the password of the router to the smart home device.

In a possible implementation, the sending a Wi-Fi name and a password of the router to the smart home device includes: sequentially broadcasting, on each channel supported by the electronic device, information about the Wi-Fi name and the password of the router, where the information carries identification information of the smart home device, so that the smart home device sequentially receives the information in a polling mode in the channel range supported by the smart home device, determines whether the identification information is correct, and if the identification information is correct, obtains the Wi-Fi name and the password of the router from the information.

Specifically, the Wi-Fi name and the password of the router may be carried in a data frame, and there may be one or more data frames.

In this embodiment of this application, the electronic device may send the Wi-Fi name and the password of the router to the smart home device without connecting to the smart home device. The electronic device may always be connected to the router, and data transmission between the electronic device and the router is not affected.

According to a tenth aspect, an embodiment of this application provides a computer storage medium, including computer instructions. When the computer instructions are run on an electronic device, the electronic device performs the method for accessing a network by a smart home device according to the ninth aspect or any one of the possible implementations of the ninth aspect of the embodiments of this application.

According to an eleventh aspect, an embodiment of this application provides a computer program product. When the computer program product is run on an electronic device, the electronic device performs the method for accessing a network by a smart home device according to the ninth aspect or any one of the possible implementations of the ninth aspect of the embodiments of this application.

It may be understood that both the computer storage medium according to the tenth aspect and the computer program product according to the eleventh aspect are configured to perform the method for accessing a network by a smart home device according to the ninth aspect. Therefore, for beneficial effects that can be achieved, refer to beneficial effects in the method for accessing a network by a smart home device according to the ninth aspect. Details are not described herein again.

BRIEF DESCRIPTION OF DRAWINGS

FIG. 11 is a schematic diagram of a format of a country field according to an embodiment of this application;

FIG. 12 is a schematic diagram of correspondences between different countries and a country code, a first channel number, the number of channels, and a supported channel range in a 2.4 GHz band range;

DESCRIPTION OF EMBODIMENTS

The technical solutions according to embodiments of this application are clearly and completely described in the following with reference to the accompanying drawings.

Figure 1:
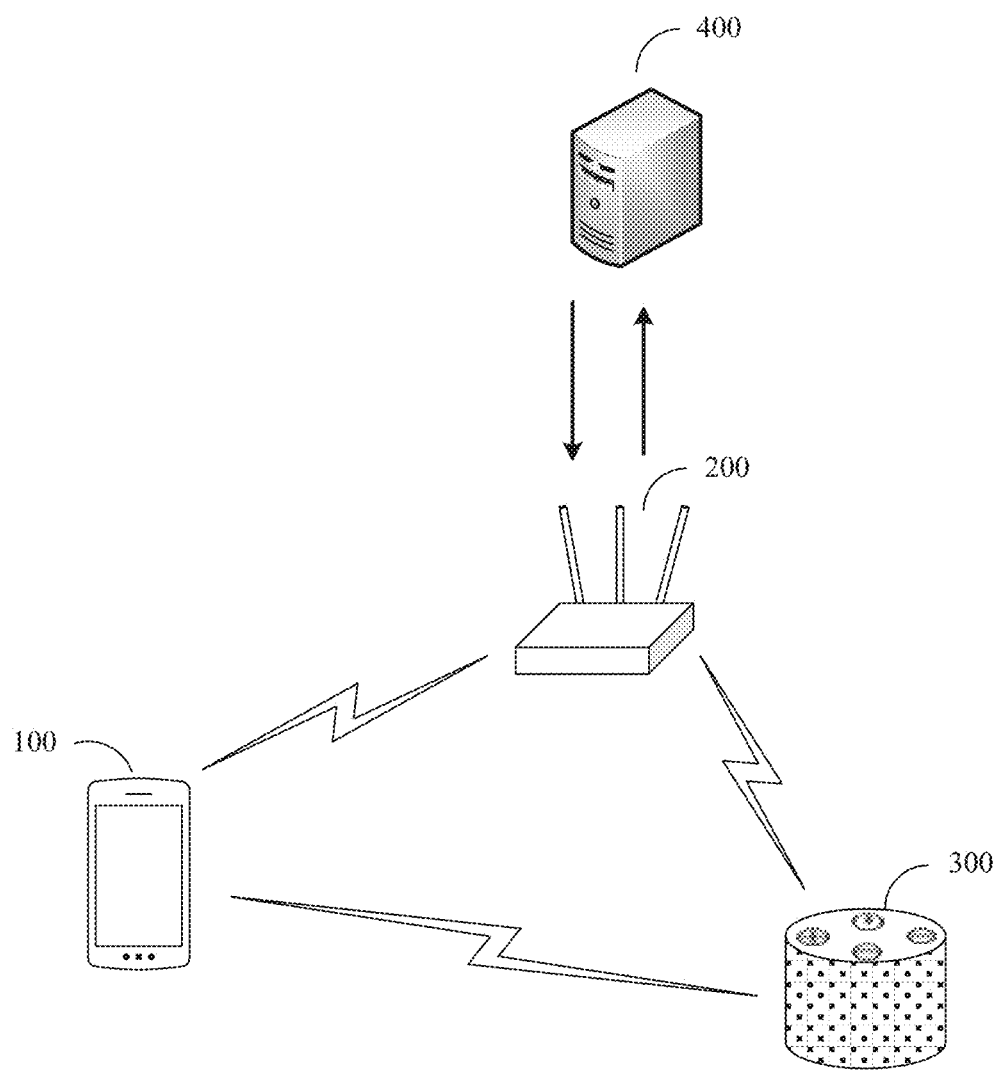
FIG. 1 is a schematic diagram of a network architecture of a smart home system according to an embodiment of this application.

First, referring to FIG. 1, FIG. 1 is a schematic diagram of a network architecture of a smart home system according to an embodiment of this application.

As shown in FIG. 1, the network architecture of the smart home system may include an electronic device 100, a router 200, a smart home device 300, and a cloud server 400. The electronic device 100 may communicate with the router 200 to obtain an operating channel of the router 200 and a channel range supported by the router 200. The operating channel is a band used by the router 200 to send data. The channel range supported by the router 200 is determined by a country to which the router 200 is applicable, and channel ranges supported by devices in different countries may be different. For example, there are 14 channels separated every 5 MHz in a 2.4 GHz band range (except that channel 14 and channel 13 are 12 MHz apart), a bandwidth of each channel is 20 MHz, and the channels may be sequentially numbered as channel 1 to channel 14, A channel range supported by devices in China in a 2.4 GHz band is channel 1 to channel 13. A channel range supported by devices in the United States in this band is channel 1 to channel 11, Because bands between channel 1, channel 6, and channel 13 do not overlap at all, signal interference does not occur with each other. Therefore, channel 1, channel 6, and channel 13 are relatively common channels.

The electronic device 100 may further receive information broadcast by the smart home device 300, to obtain a channel range supported by the smart home device 300. The electronic device 100 may send a Wi-Fi name and a password of the router 200 to the smart home device 300. The electronic device 100 may determine whether the operating channel of the router 200 is within the channel range supported by the smart home device 300; and if the operating channel of the router 200 is not within the channel range supported by the smart home device 300, the electronic device 100 may indicate the router 200 to switch the operating channel, so that the operating channel of the router 200 is within the channel range supported by the smart home device 300. Therefore, the smart home device 300 can connect to the router 200, and connect to the cloud server 400 through the router 200. The electronic device 100 may send a control instruction to the smart home device 300 by using the cloud server 400. Application software (application software, APP) used to control the smart home device may be installed on the electronic device 100. The app may be, for example, a smart home app. The cloud server 400 may be an application server corresponding to the application software, and the cloud server 400 may be, for example, an application server of a smart home app.

The electronic device 100 in this embodiment of this application may be a mobile phone, a tablet computer, a desktop computer, a laptop computer, a notebook computer, an ultra-mobile personal computer (ultra-mobile personal computer, UMPC), a handheld computer, a netbook, or a personal digital assistant (personal digital assistant, PDA), a wearable electronic device, a virtual reality device, or the like.

The smart home device 300 in this embodiment of this application may be a smart speaker, a floor sweeping robot, a smart socket, a smart lamp, a smart body fat scale, a smart desk lamp, an air purifier, a smart refrigerator, a smart air conditioner, a smart washing machine, a smart water heater, a smart microwave oven, a smart rice cooker, a smart curtain, a smart fan, a smart TV, a smart set-top box, or the like.

Not limited to the smart home device 300, the system may further be applicable to a vehicle-mounted device, a wearable electronic device, or the like, so that the device such as the vehicle-mounted device or the wearable electronic device can smoothly connect to the router. This is not limited in this embodiment of this application.

The following describes example electronic devices provided in the following embodiments of this application.

Figure 2:
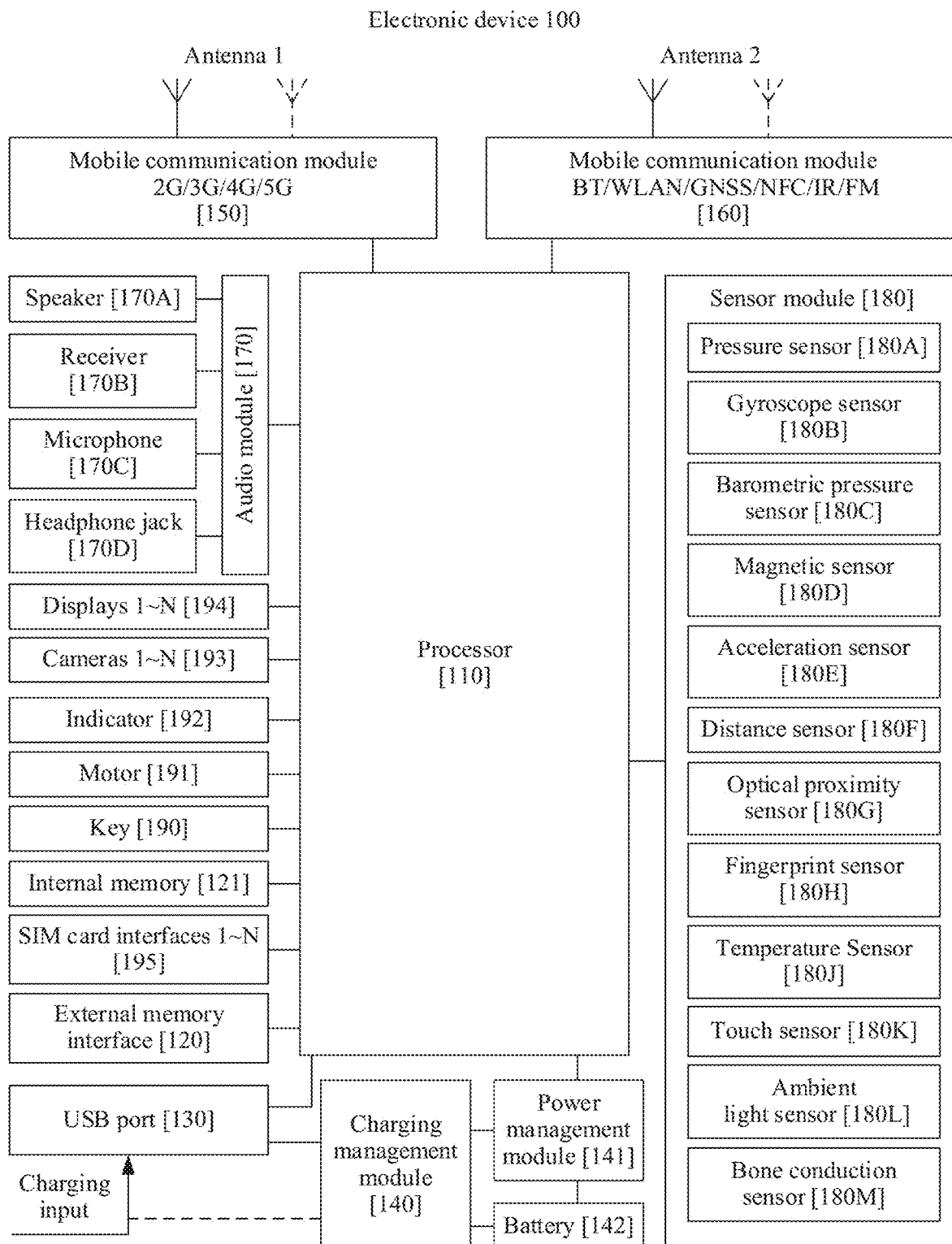
FIG. 2 is a schematic structural diagram of an electronic device according to an embodiment of this application.

FIG. 2 is a schematic structural diagram of an electronic device 100.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure shown in the embodiments of the present invention does not constitute a specific limitation on the electronic device 100. In some other embodiments of this application, the electronic device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the electronic device 100. The controller may generate an operation control signal based on instruction operation code and a time sequence signal, to control to read instructions and execute instructions.

The memory ma further be disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory, to avoid repeated access. This reduces a waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

It can be understood that an interface connection relationship between the modules shown in the embodiments of the present invention is merely an example for description, and does not constitute a limitation on the structure of the electronic device 100. In some other embodiments of this application, the electronic device 100 may alternatively use an interface connection mode different from that in the foregoing embodiment, or use a combination of a plurality of interface connection modes.

The charging management module 140 is configured to receive a charging input from the charger. The charger may be a wireless charger or a wired charger. In some embodiments in which wired charging is used, the charging management module 140 may receive a charging input from the wired charger through the USB port 130. In some embodiments in which wireless charging is used, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect the battery 142 and the charging management module 140 to the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as battery power, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 each are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communications module 150 may provide a solution, applied to the electronic device 100, to wireless communication including 2G/3G/4G/5G, and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert an amplified signal into an electromagnetic wave through the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. In some embodiments, the modem processor may be an independent device. In some other embodiments, the modem processor may be independent of the processor 110, and is disposed in a same device as the mobile communications module 150 or another function module.

The wireless communications module 160 may provide a wireless communication solution that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, (NGS), frequency modulation (frequency modulation, FM), a near field communication (near field communication, NFC) technology, an infrared (infrared, IR) technology, or the like and that is applied to the electronic device 100. The wireless communications module 160 may be one or more devices that integrate at least one communications processing module. The wireless communications module 160 receives an electromagnetic wave through the antenna 2, performs frequency modulation and filtering on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2. In the embodiments of this application, the wireless communications module 160 may be a Wi-Fi module. The electronic device 100 may find, by using the Wi-Fi module, a beacon frame broadcast by a router 200, and may establish a connection to the router 200 after finding the beacon frame broadcast by the router 200. In the embodiments of this application, the electronic device 100 may further find, by using the Wi-Fi module, the beacon frame broadcast by a smart home device 300, and may further establish a connection to the smart home device 300 after finding the beacon frame broadcast by the smart home device 300.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (heidou navigation satellite system, BDS), a quasi-zenith satellite system (quasi-zenith satellite system, QZSS), and/or satellite based augmentation systems (satellite based augmentation systems, SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and perform graphics rendering. The processor 110 may include one or more GPUs that execute program instructions to generate or change display information.

The display 194 is configured to display an image, a video, and the like. The display 194 includes a display panel. A liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, quantum dot light emitting diodes (quantum dot light emitting diodes, QLED), or the like may be used for the display panel. In some embodiments, the electronic device 100 may include one or N displays 194, where N is a positive integer greater than 1.

The electronic device 100 may implement a shooting function by using the ISP, the camera 193, the video codec, the GPU, the display 194, the application processor, and the like.

The ISP is configured to process data fed back by the camera 193. For example, during shooting, a shutter is pressed, and light is transmitted to a photosensitive element of the camera through a lens. The photosensitive element of the camera converts an optical signal into an electrical signal, and transmits the electrical signal to the ISP for processing. The ISP converts the electrical signal into an image that is perceptible to the eye. The ISP may further perform algorithm optimization on noise, brightness, and complexion of the image. The ISP may further optimize parameters such as exposure and color temperature of a shooting scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device. CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1.

The digital signal processor is configured to process a digital signal, and may further process another digital signal in addition to a digital image signal. For example, when the electronic device 100 selects a frequency, the digital signal processor is configured to perform Fourier transform and the like on frequency energy.

The video codec is configured to compress or decompress a digital video. The electronic device 100 may support one or more video codecs. In this way, the electronic device 100 can play or record videos in a plurality of coding formats, for example, moving picture experts group (moving picture experts group, MPEG)-1, MPEG-2, MPEG-3, MPEG-4, and the like.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 100, for example, image recognition, facial recognition, speech recognition, and text understanding, can be implemented by using the NPU.

The external memory interface 120 may be configured to connect to an external storage card, for example, a micro SD card, to extend a storage capability of the electronic device 100. The external storage card communicates with the processor 110 through the external memory interface 120 to implement a data storage function. For example, files such as music and a video are stored in the external memory card.

The internal memory 121 may be configured to store computer-executable program code. The executable program code includes instructions. The processor 110 runs the instructions stored in the internal memory 121 to perform various function applications of the electronic device 100 and process data. The internal memory 121 may include a program storage area and a data storage area. The program storage area may store an operating system, an application required by at least one function (for example, a sound playing function or an image playing function), and the like. The data storage area may store data (for example, audio data, and a phone book) created in a process of using the electronic device 100, and the like. In addition, the internal memory 121 may include a high-speed random access memory, and may further include a nonvolatile memory, for example, at least one magnetic disk storage device, a flash memory device, or a universal flash storage (universal flash storage, UFS).

The electronic device 100 may implement audio functions, for example, music playing and recording, by using the audio module 170, the speaker 170A, the receiver 170B, the microphone 170O, the headset jack 170D, the application processor, and the like.

The audio module 170 is configured to convert digital audio information into an analog audio signal output, and is further configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device 100 may be configured to listen to music or answer a hands-free call by using the speaker 170A.

The receiver 170B, also referred to as an "earpiece", is configured to convert an audio electrical signal into a sound signal. When the electronic device 100 answers a call or receives voice information, the receiver 170B may be placed near a human ear to listen to a voice.

The microphone 170C, also referred to as a "mike" or a "microphone", is configured to convert a sound signal into an electrical signal. When making a call or sending a voice message, a user may make a sound near the microphone 170C, to input a sound signal to the microphone 170O. At least one microphone 170C may be disposed in the electronic device 100. In some other embodiments, two microphones 170C may be disposed in the electronic device 100, to implement a noise reduction function, in addition to collecting a sound signal. In some other embodiments, three, four, or more microphones 170C may alternatively be disposed in the electronic device 100, to collect a sound signal and reduce noise. The microphones may further identify a sound source, to implement a directional recording function, and the like.

The headset jack 170D is configured to connect to a wired headset. The headset jack 170D may be the USB port 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There is a plurality of types of pressure sensors 180A, such as a resistive pressure sensor, an inductive pressure sensor, and a capacitive pressure sensor. The capacitive pressure sensor may include at least two parallel plates made of conductive materials. Capacitance between electrodes changes when force is applied to the pressure sensor 180A. The electronic device 100 determines pressure strength based on a capacitance change. When a touch operation is performed on the display 194, the electronic device 100 detects intensity of the touch operation by using the pressure sensor 180A, The electronic device 100 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on a Messages icon, an instruction for creating a new SMS message is executed.

The gyroscope sensor 180B may be configured to determine a motion posture of the electronic device 100.

The barometric pressure sensor 180C is configured to measure barometric pressure.

The magnetic sensor 180D includes a Hall sensor.

The acceleration sensor 180E may detect magnitude of accelerations in various directions (usually on three axes) of the electronic device 100, and may detect magnitude and a direction of gravity when the electronic device 100 is still. The acceleration sensor 180E may be further configured to identify a posture of the electronic device, and is applied to an application such as switching between a landscape mode and a portrait mode or a pedometer.

The distance sensor 180F is configured to measure a distance.

The optical proximity sensor 180G may include, for example, a light emitting diode (LED) and an optical detector, for example, a photodiode.

The ambient light sensor 180L, is configured to sense ambient light brightness.

The fingerprint sensor 180H is configured to collect a fingerprint. The electronic device 100 may use a feature of the collected fingerprint to implement fingerprint-based unlocking, application lock access, fingerprint-based shooting, fingerprint-based call answering, and the like.

The temperature sensor 180J is configured to detect a temperature. In some embodiments, the electronic device 100 executes a temperature processing policy based on the temperature detected by the temperature sensor 180J.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of the touch event. A visual output related to the touch operation may be provided by using the display 194. In some other embodiments, the touch sensor 180K may alternatively be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may alternatively be disposed in a headset, to obtain a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The key 190 includes a power key, a volume key, and the like. The key 190 may be a mechanical button, or may be a touch-sensitive key. The electronic device 100 may receive a key input, and generate a key signal input related to user settings and function control of the electronic device 100.

The motor 191 may generate a vibration prompt. The motor 191 may be configured to provide an incoming call vibration prompt and a touch vibration feedback. For example, touch operations performed on different applications (for example, shooting and audio playing) may correspond to different vibration feedback effects. The motor 191 may also correspond to different vibration feedback effects for touch operations performed on different areas of the display 194. Different application scenarios (for example, a time reminder, information receiving, an alarm clock, a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted in the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted in a same SIM card interface 195. The plurality of cards may be of a same type or of different types. The SIM card interface 195 may also be compatible with different types of SIM cards. The SIM card interface 195 may further be compatible with an external memory card. The electronic device 100 interacts with a network through the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

A software system of the electronic device 100 may use a layered architecture, an event-driven architecture, a microkernel architecture, a micro service architecture, or a cloud architecture. In this embodiment of the present invention, an Android system with the layered architecture is used as an example to illustrate a software structure of the electronic device 100.

Figure 3:
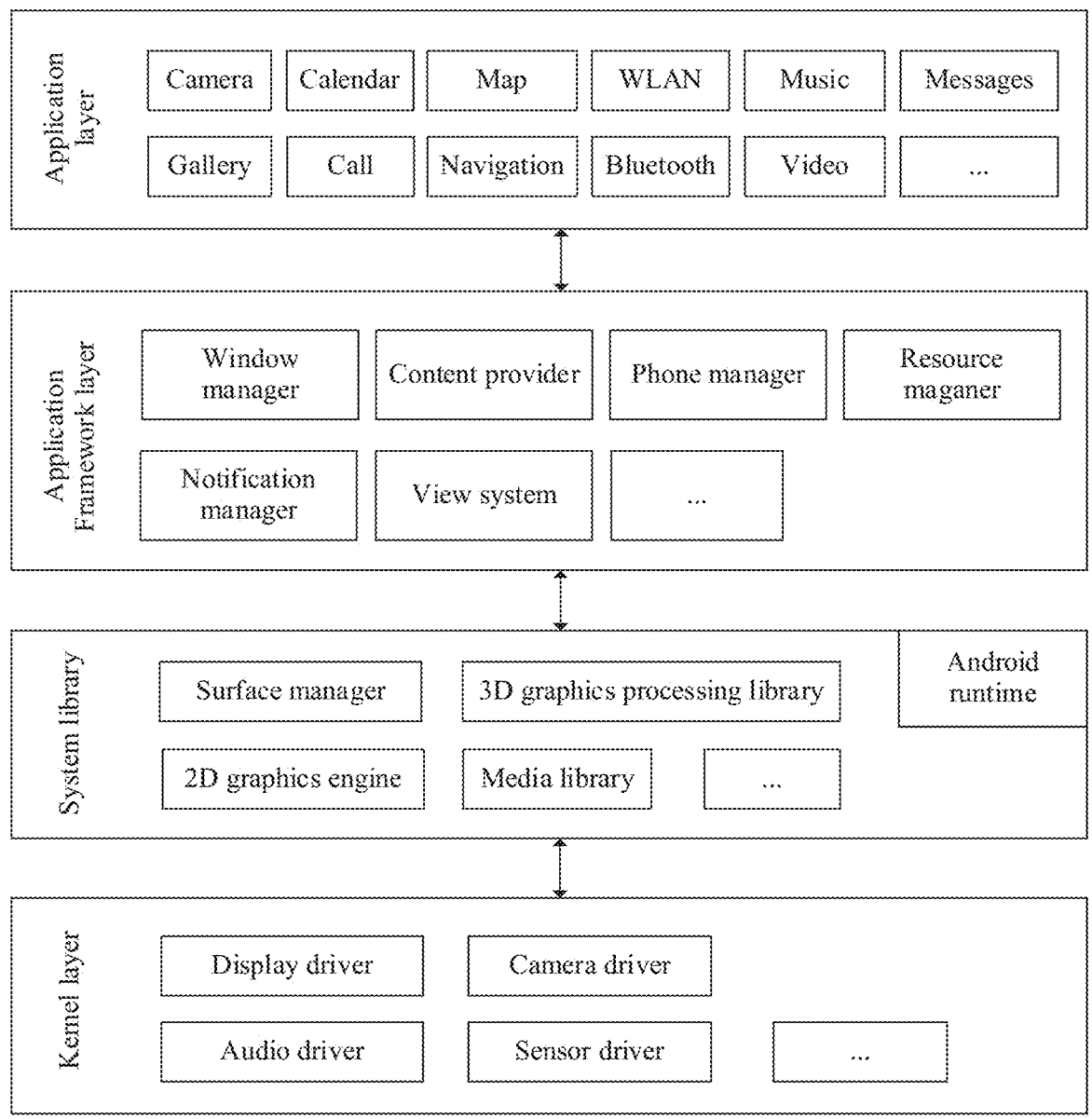
FIG. 3 is a software structural block diagram of an electronic device according to an embodiment of this application.

FIG. 3 is a block diagram of the software structure of the electronic device 100 according to an embodiment of the present invention.

In the layered architecture, software is divided into several layers, and each layer has a clear role and task. The layers communicate with each other through a software interface. In some embodiments, the Android system is divided into four layers: an application layer, an application framework layer, an Android runtime (Android runtime), a system library, and a kernel layer from top to bottom.

The application layer may include a series of application packages.

As shown in FIG. 3, the application packages may include applications such as "camera", "gallery", "calendar", "calls", "maps", "navigation", "WLAN", "Bluetooth", "music", "videos", and "messages".

The application framework layer provides an application programming interface (application programming interface, API) and a programming framework for an application at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, an audio, calls that are made and received, a browsing history and a bookmark, a phone book, and the like.

The view system includes visual controls such as a control for displaying text and a control for displaying an image. The view system may be configured to construct an application. A display interface may include one or more views. For example, a display interface including a Messages notification icon may include a text display view and an image display view.

The phone manager is configured to provide a communication function of the electronic device 100, for example, management of a call status (including answering, declining, or the like).

The resource manager provides various resources for an application, such as a localized character string, an icon, an image, a layout file, and a video file.

The notification manager enables an application to display notification information in the status bar, and may be configured to convey a notification message. The notification manager may automatically disappear after a short pause without requiring a user interaction.

The Android runtime includes a kernel library and a virtual machine. The Android runtime is responsible for scheduling and managing the Android system.

The kernel library includes two parts: a function that needs to be invoked in java language and a kernel library of Android.

The application layer and the application framework layer run in the virtual machine. The virtual machine executes java files of the application layer and the application framework layer as binary files. The virtual machine is configured to perform functions such as object lifecycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording of a plurality of commonly used audio and video formats, static image files, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working process of software and hardware of the electronic device 100 with reference to a shooting scenario.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. An example in which the touch operation is a touch tap operation, and a control corresponding to the tap operation is a control of a camera application icon is used. The camera application invokes an interface at the application framework layer to enable the camera application, then enables a camera driver by invoking the kernel layer, and captures a static image or a video by using the camera 193.

Figure 4:
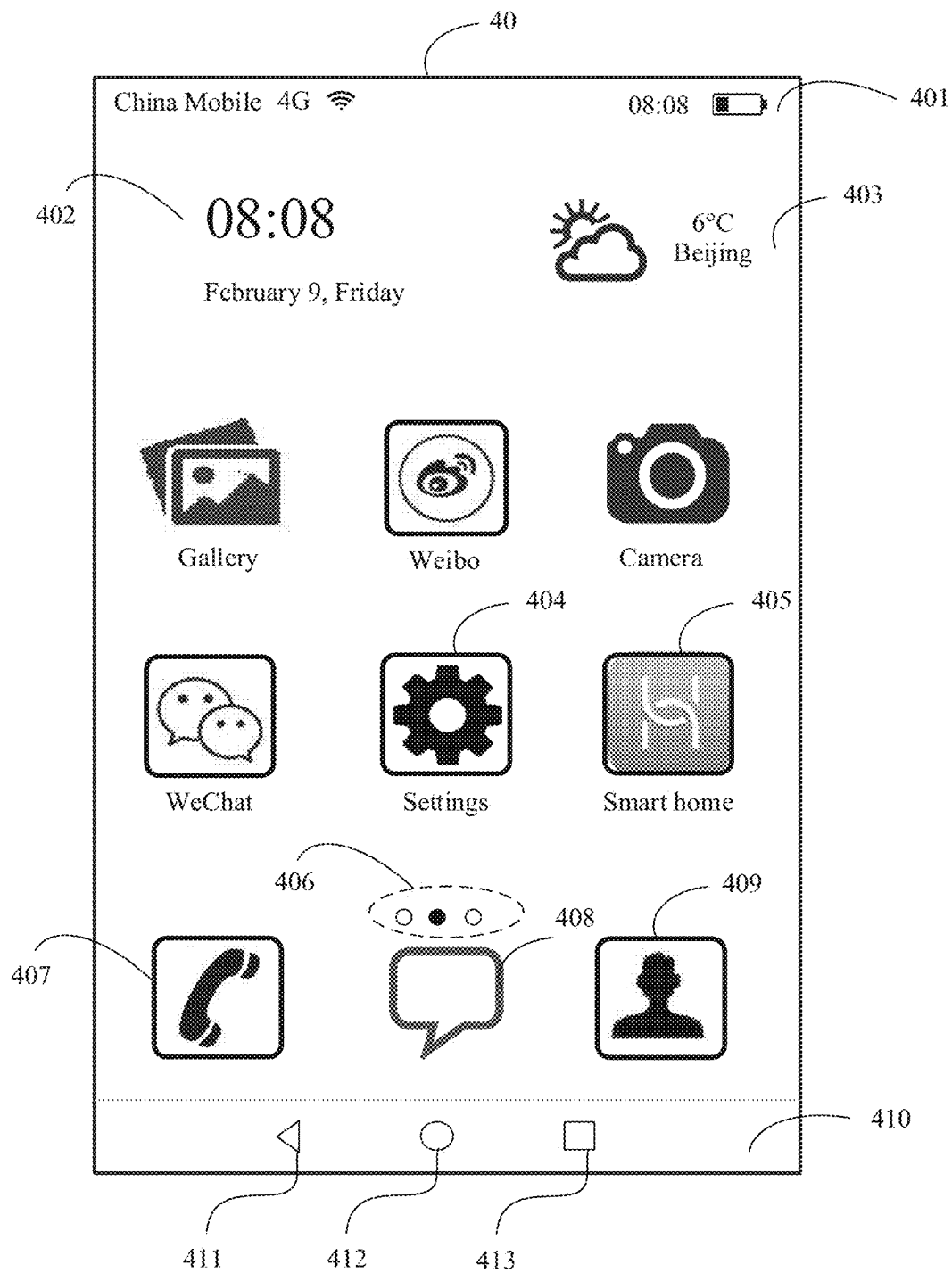
FIG. 4 to FIG. 9 are schematic diagrams of user interfaces according to an embodiment of this application.

FIG. 4 shows an example of a user interface for an application menu on the electronic device 100.

The user interface 40 in FIG. 4 may include a status bar 401, a time component icon 402, a weather component icon 403, and a plurality of application icons, such as a camera icon, a WeChat icon, a setting icon 404, an album icon, a Weibo icon, and a smart home icon 405. The user interface 40 may further include a page indicator 406, a phone icon 407, a short message icon 408, a contact icon 409, a navigation bar 410, and the like.

The status bar 402 may include an operator indicator (for example, an operator name "China Mobile"), one or more signal strength indicators of a wireless fidelity (wireless fidelity, Wi-Fi) signal, one or more signal strength indicators of a mobile communication signal (also referred to as a cellular signal), and a battery status indicator.

The time component icon 402 may be used to indicate a current time, such as a date, day of the week, and hour and minute information.

The weather component icon 403 may be used to indicate a weather type, such as cloudy to sunny or light rain, and may further be used to indicate information such as temperature.

The page indicator 406 may be used to indicate an application on which page a user is currently browsing. The user can swipe left or right on an area of a plurality of application icons to browse application icons on other pages.

The navigation bar 410 may include system navigation keys such as a back button 411, a home screen (Home screen) button 412, and an outbound task history button 413. A home screen is an interface displayed by the electronic device 100 after any user interface detects a user operation that acts on the home screen button 412. When detecting that the user taps the back button 411, the electronic device 100 may display a previous user interface of the current user interface. When detecting that the user taps the home screen button 412, the electronic device 100 may display the home screen. When detecting that the user taps the outbound task history button 413, the electronic device 100 may display a task recently opened by the user. The navigation keys may have other names. For example, 411 may be referred to as a Back Button, 412 may be referred to as a Home button, and 413 may be referred to as a Menu Button. This is not limited in this application. The navigation keys in the navigation bar 410 are not limited to virtual keys, and may also be implemented as physical keys.

It may be understood that FIG. 4 merely shows an example of a user interface on the electronic device 100, and should not constitute a limitation on this embodiment of this application.

Figure 5:
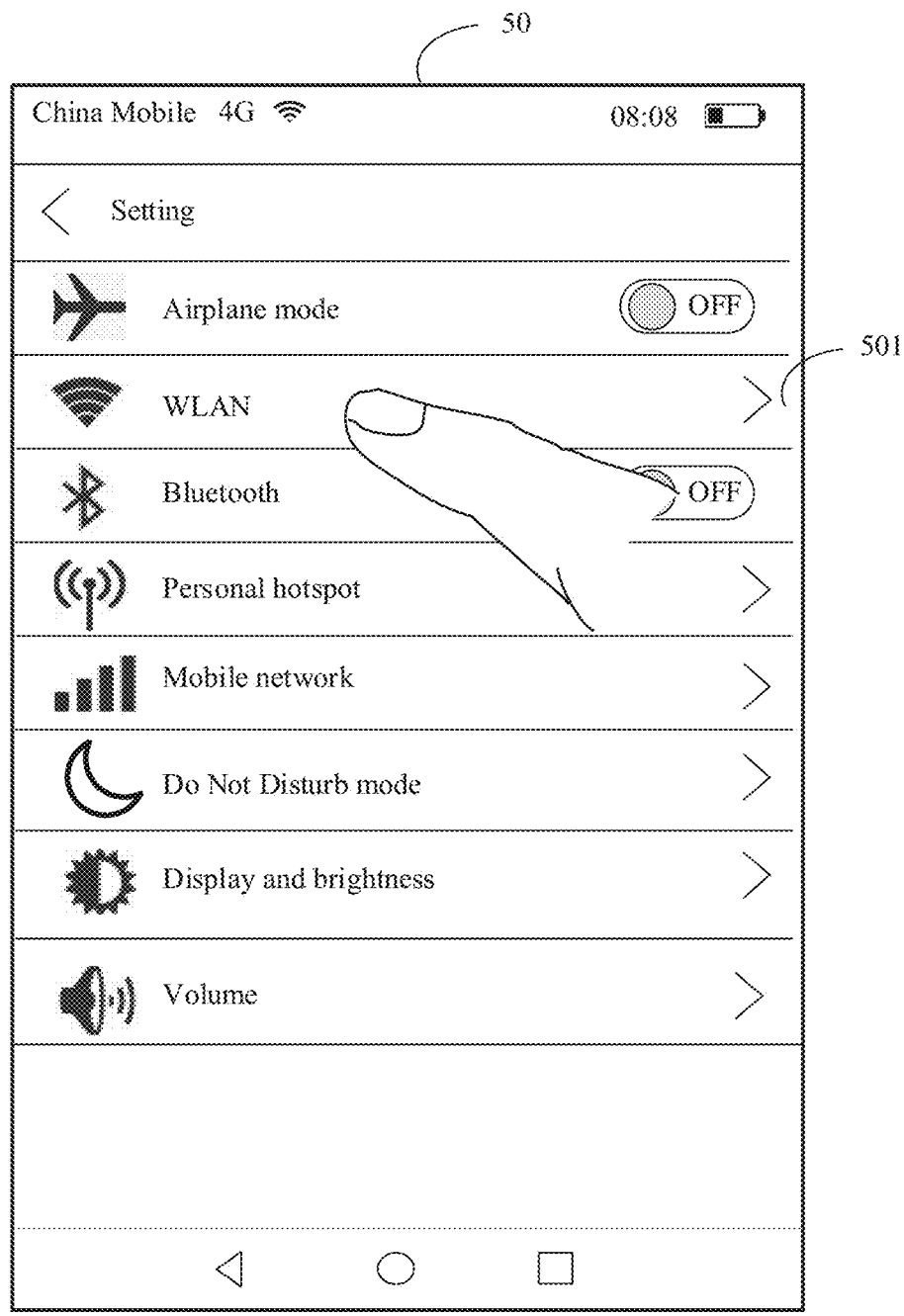

The electronic device 100 may detect a user operation that acts on the setting icon 404 (for example, a tap operation on the setting icon 404), and in response to the operation, the electronic device 100 may display a user interface 50 shown in FIG. 5 for setting a system parameter. The system parameter may be, for example, an airplane mode status (enabled or disabled), a wireless local area network (wireless LAN, WLAN) status (enabled or disabled), a Bluetooth status (enabled or disabled), a personal hotspot status (enabled or disabled), a mobile network status (enabled or disabled), a Do Not Disturb mode status (enabled or disabled), a display and brightness level, or a volume level. The user interface 50 may include a setting entry of each system parameter, for example, a WLAN setting entry 501. The electronic device 100 may detect a user operation that acts on the WLAN setting entry 501 (for example, a tap operation on the WLAN setting entry 501), and in response to the operation, the electronic device 100 may display a user interface 60 in the embodiment of FIG. 6. In other words, the user may tap the WLAN setting entry 501 to open a user interface for setting a WL AN.

The following describes a user interface (user interface, UI) embodiment provided in the embodiments of this application with reference to schematic diagrams of application scenarios shown in FIG. 4 to FIG. 5.

Figure 6:
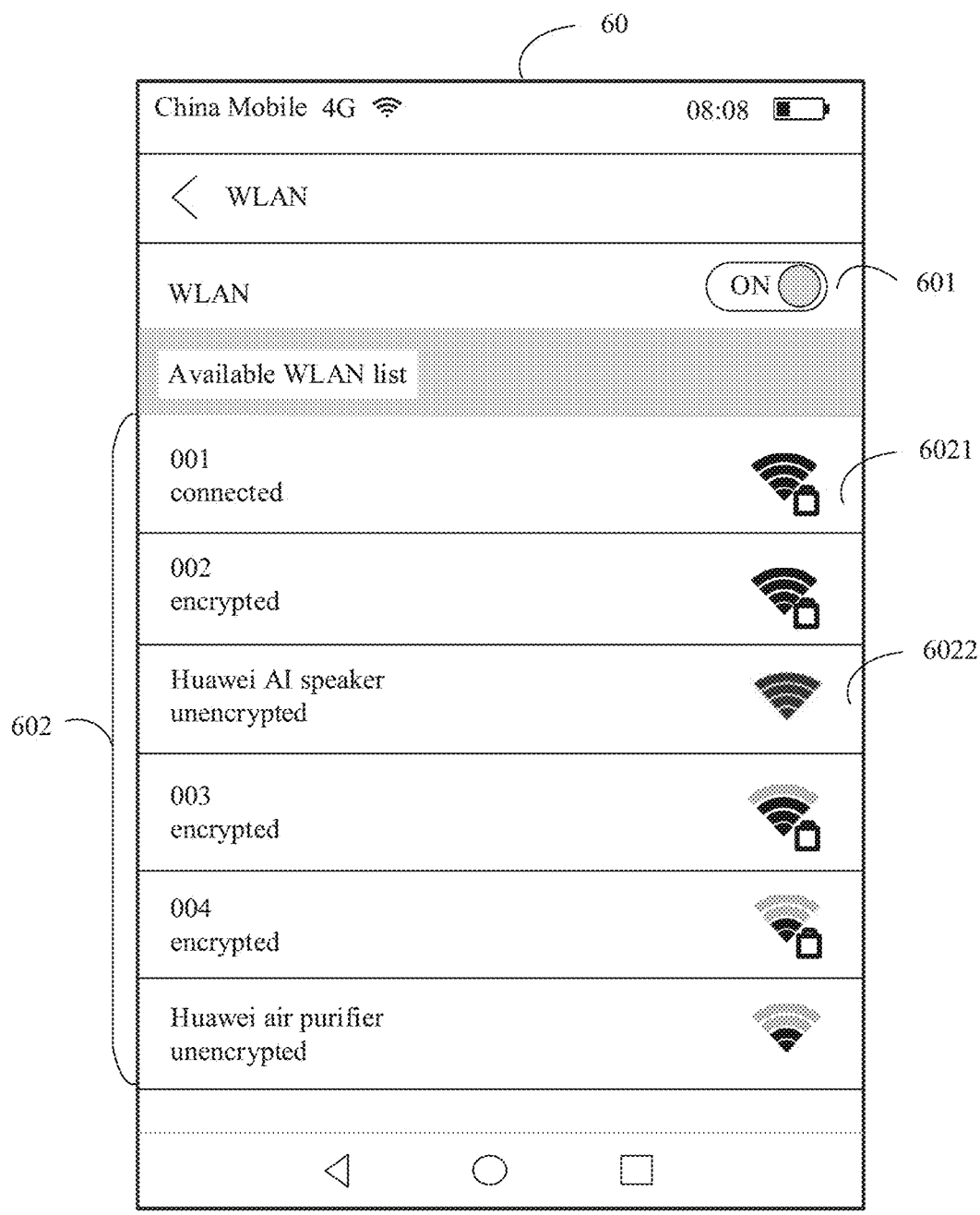

FIG. 6 shows an example of a user interface 60 for setting a WLAN.

As shown in FIG. 6, the user interface 60 may include a switch control 601 and an available WLAN list 602.

The switch control 601 is used to enable or disable a WLAN. The electronic device 100 may detect a right slide operation that acts on the switch control 601, and in response to the right slide operation, the electronic device 100 may enable a WLAN, and search for an accessible device within a channel range supported by the electronic device 100.

The available WLAN list 602 is used to display an accessible device that is in an access point (access point, AP) mode and that is found by the electronic device 100, and signal strength of the device. Devices in the AP mode all broadcast a beacon frame on operating channels of the devices to wait for device access. The AP refers to a wireless access point, is a creator of a wireless network, and is a central node of the network. A device operating in the AP mode may provide a wireless access service to allow access of other wireless devices and provide data access. The device in the AP mode may be a router or a smart home device. The smart home device may be, but is not limited to, a smart speaker, a floor sweeping robot, a smart socket, a smart lamp, a smart body fat scale, a smart desk lamp, an air purifier, a smart refrigerator, a smart air conditioner, a smart washing machine, a smart water heater, a smart microwave oven, a smart rice cooker, a smart curtain, a smart fan, a smart TV, a smart set-top box, or the like.

The available WLAN list 602 may include an option of an accessible device for device access, for example, an option 6021 of a router 001 and an option 6022 of a smart home device Huawei AI speaker. The electronic device 100 may detect a user operation that acts on an option (for example, a tap operation on the option), and in response to the user operation, the electronic device 100 may initiate an access request to a device corresponding to the option.

The following separately describes, in two different cases, how the electronic device 100 connects to the router 200. An example in which the electronic device 100 connects to the router 200 whose Wi-Fi name is 001 is used for description.

Case 1: If the electronic device 100 has never been connected to the router 200 whose Wi-Fi name is 001, the electronic device 100 may detect a user operation that acts on the option 6021 (for example, a tap operation on the option 6021), and in response to the user operation, the electronic device 100 may prompt the user to enter a password. After detecting that the user enters the password, the electronic device 100 may send the password to the router 200 whose Wi-Fi name is 001. The router 200 whose Wi-Fi name is 001 may compare the password sent by the electronic device 100 with a prestored password. If the password sent by the electronic device 100 is consistent with the prestored password, the router 200 whose Wi-Fi name is 001 establishes a connection to the electronic device 100. The electronic device 100 may store identification information and the password of the router 200 whose Wi-Fi name is 001 to an internal memory 121. The identification information of the router may be a media access control address (media access control address, MAC) address or a Wi-Fi name. (SSID) of the router. The MAC address or the Wi-Fi name of the router may be carried in a beacon frame broadcast by the router.

Case 2: if the electronic device 100 has been once connected to the router 200 whose Wi-Fi name is 001, after detecting a beacon frame broadcast by the router 200 whose Wi-Fi name is 001, the electronic device 100 obtains identification information of the router based on the beacon frame, finds a password of the router from an internal memory 121 based on the identification information, and sends the password to the router, to connect to the router.

The following describes how the electronic device 100 sends the Wi-Fi name and the password of the router to the smart home device 300. An example in which the router is a router 200 whose Wi-Fi name is 001 and the smart home device is a Huawei AI speaker is used for description.

In a possible embodiment, when the electronic device 100 has been connected to the router 200, if the electronic device 100 detects a user operation that acts on the option 6022 (for example, a tap operation on the option 6022), the electronic device 100 may send the Wi-Fi name and the password of the router 200 to the Huawei AI speaker.

Figure 7:
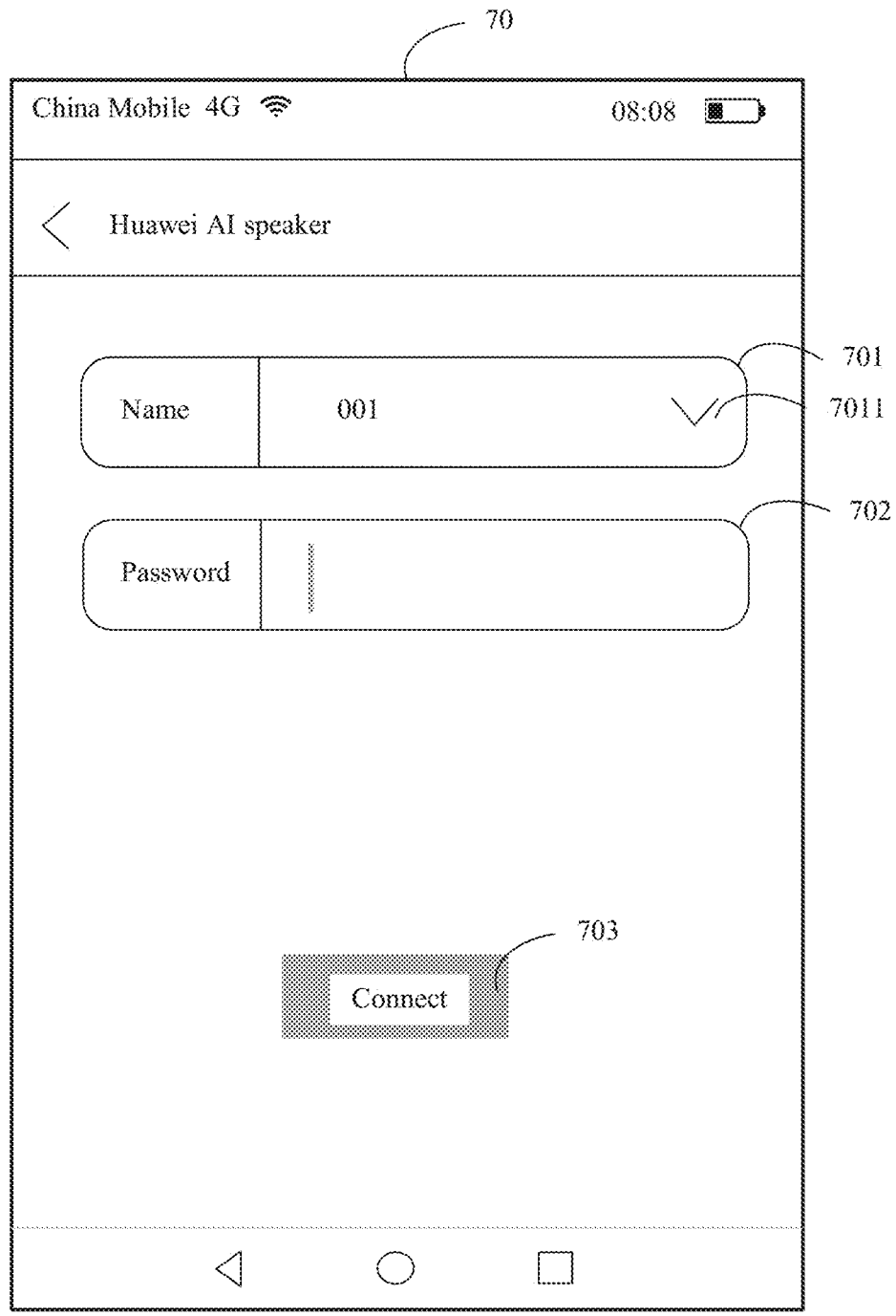

In another possible embodiment, the electronic device 100 has not been connected to any router. If the electronic device 100 detects a user operation that acts on the option 6022 (for example, a tap operation on the option 6022), the electronic device 100 may display a user interface 70 shown in FIG. 7 for connecting to the router 200. Specifically, the user interface 70 may include a option 701, a password entry bar 702, and a connection control 703.

The Wi-Fi option 701 may be used to select a target router. In a possible implementation, the Wi-Fi option 701 may display names of routers that have been recently connected to the electronic device 100. The user may further use a drop-down control 7011 to view names of other connectable routers, and tap a corresponding name to select the target router. In another possible implementation, the Wi-Fi option 701 does not display names of routers. The user may use the drop-down control 7011 to view names of connectable routers, and tap a corresponding name to select the target router.

The password entry bar 702 may be used to enter a Wi-Fi password of the router. After the user selects the target router by using the Wi-Fi option 701, the electronic device 100 may detect a user operation that acts on the password entry bar 702 (for example, a tap operation on the password entry bar 702), and in response to the operation, the electronic device 100 may display a keyboard for entering a password, and receive the password entered by the user.

The connection control 703 is used to connect to the router. The electronic device 100 may detect a user operation that acts on the connection control 703 (for example, a tap operation on the connection control 703), and in response to the operation, the electronic device 100 may send the name of the router selected in the Wi-Fi option 701 and the password entered by the user in the password entry bar 702 to the Huawei AI speaker.

The foregoing embodiment describes how the electronic device 100 sends the Wi-Fi name and the password of the router to the smart home device after the electronic device 100 detects a user operation that acts on the setting icon 404.

Not limited to the foregoing manner, in this embodiment of this application, after detecting a user operation that acts on the smart home icon 405, the electronic device 100 may send the Wi-Fi name and the password of the router to the smart home device.

Figure 8:
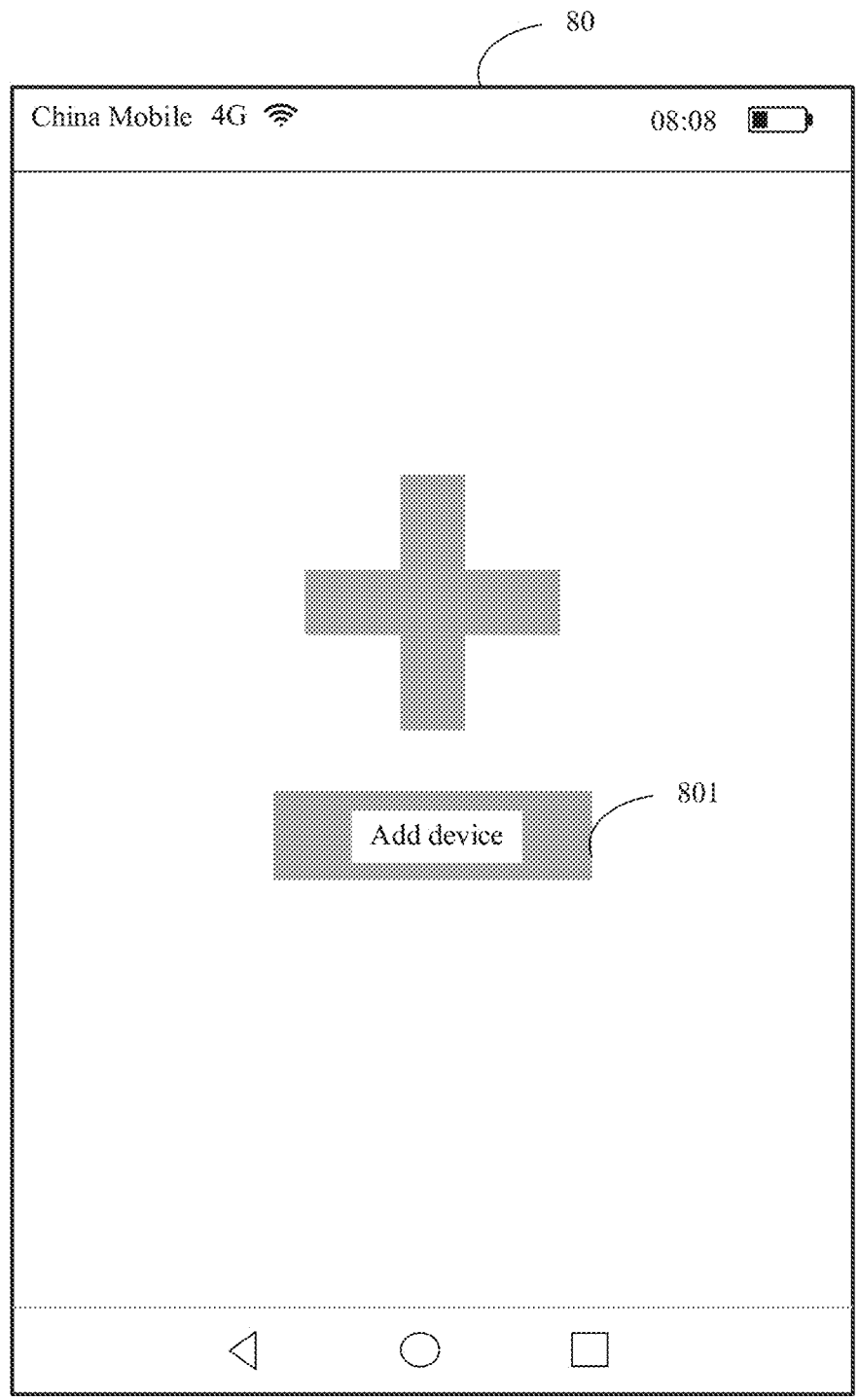

Specifically, the electronic device 100 may detect a user operation that acts on the smart home icon 405 (for example, a tap operation on the smart home icon 405), and in response to the operation, the electronic device 100 may display a user interface 80 shown in FIG. 8. The user interface 80 may include at least a device adding control 801.

Figure 9:
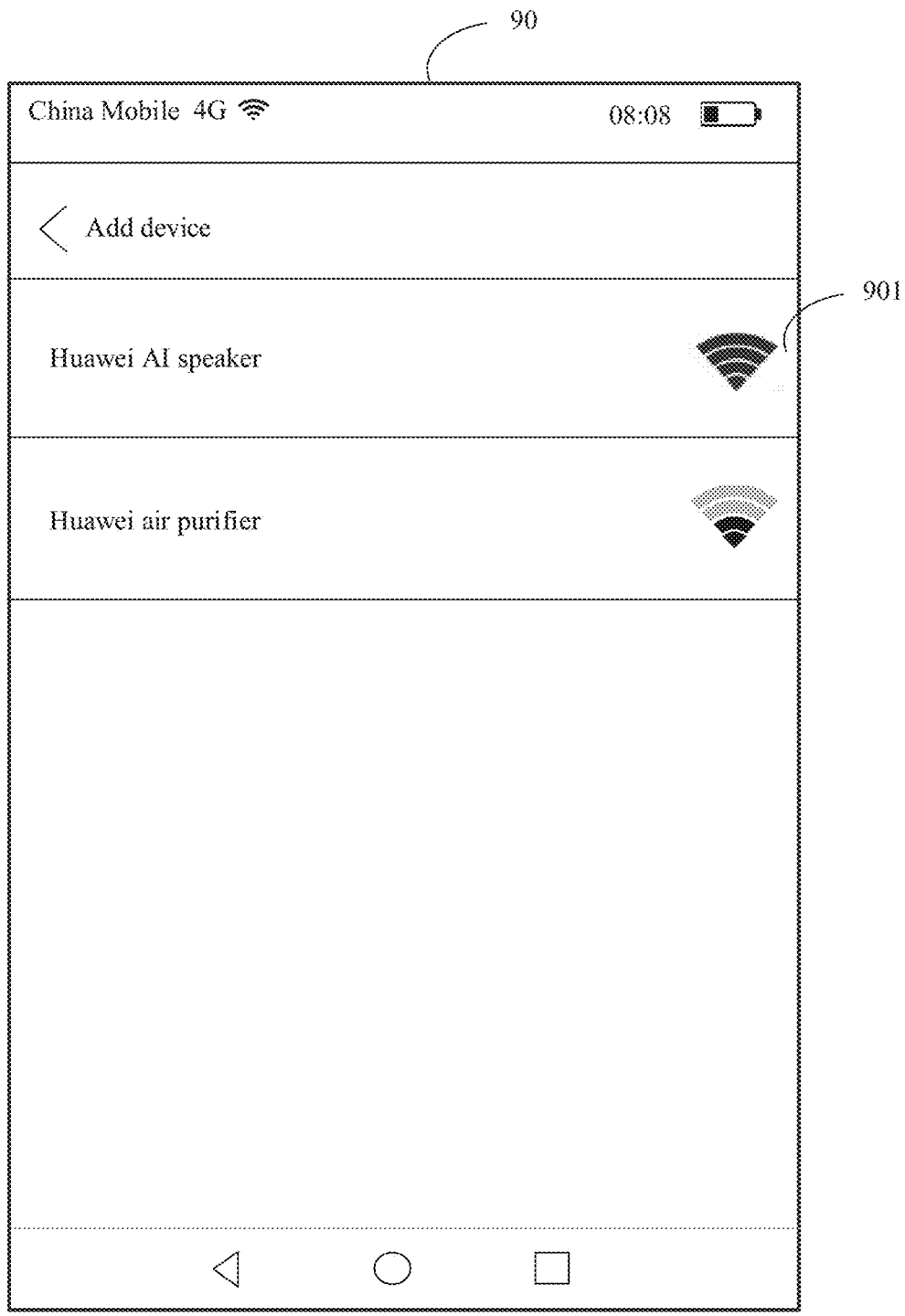

The electronic device 100 may detect a user operation that acts on the device adding control 801 (for example, a tap operation on the device adding control 801), and in response to the operation, the electronic device 100 may search for addable devices within the channel range supported by the electronic device 100, and display a list of addable devices in a user interface 90 shown in FIG. 9.

As shown in FIG. 9, the user interface 90 may include options of addable devices, for example, an option 901 of a Huawei AI speaker and an option of a Huawei air purifier. The electronic device 100 may detect a user operation that acts on an option (for example, a tap operation on the option 901), and in response to the user operation, the electronic device 100 may display the user interface 70 shown in FIG. 7 for connecting to the router. The electronic device 100 may send the name of the router selected in the Wi-Fi option 701 and the password entered by the user in the password entry bar 702 to the Huawei AI speaker based on the user interface 70. For a specific sending process, refer to the related description in the embodiment in FIG. 7. Details are not described herein again.

In a possible embodiment, when the electronic device 100 has been connected to the router 200 whose Wi-Fi name is 001, when detecting a tap operation that acts on the option 901 of the Huawei AI speaker, the electronic device 100 may directly send the Wi-Fi name and the password of the router 200 to the Huawei AI speaker.

In another possible embodiment, when the electronic device 100 has been connected to the router 200 whose Wi-Fi name is 001, when detecting a tap operation that acts on the option 901 of the Huawei AI speaker, the electronic device 100 may directly display the password in the password entry bar 702 of the user interface. 70, and the user only needs to tap the connection control 703 to send the Wi-Fi name and the password of the router 200 to the Huawei AI speaker.

The Huawei AI speaker receiving the Wi-Fi name and the password may switch the operating mode from the AP mode to a station (station, STA) mode. The STA station is that each device for example, a notebook computer, a PDA, or another smart home device that can connect to a network) connected to a wireless network may be referred to as a station. A device operating in the STA mode does not receive wireless access and can connect to an AP The Huawei AI speaker searches for a router with a Wi-Fi name consistent with the received Wi-Fi name within a channel range supported by the Huawei AI speaker and sends a password to the router. After the router confirms that the password is correct, the router establishes a connection to the Huawei AI speaker. In this case, the Huawei AI speaker connects to the network successfully. A manner in which the electronic device 100 connects to the router 200 may be any one of the foregoing two manners.

Not limited to sending the Wi-Fi name of the router, during specific implementation, the electronic device 100 may further send a MAC address (BSSID) of the router 200 to the smart home device 300.

The following describes a method for accessing a network by a smart home device provided in an embodiment of this application.

Figure 10:
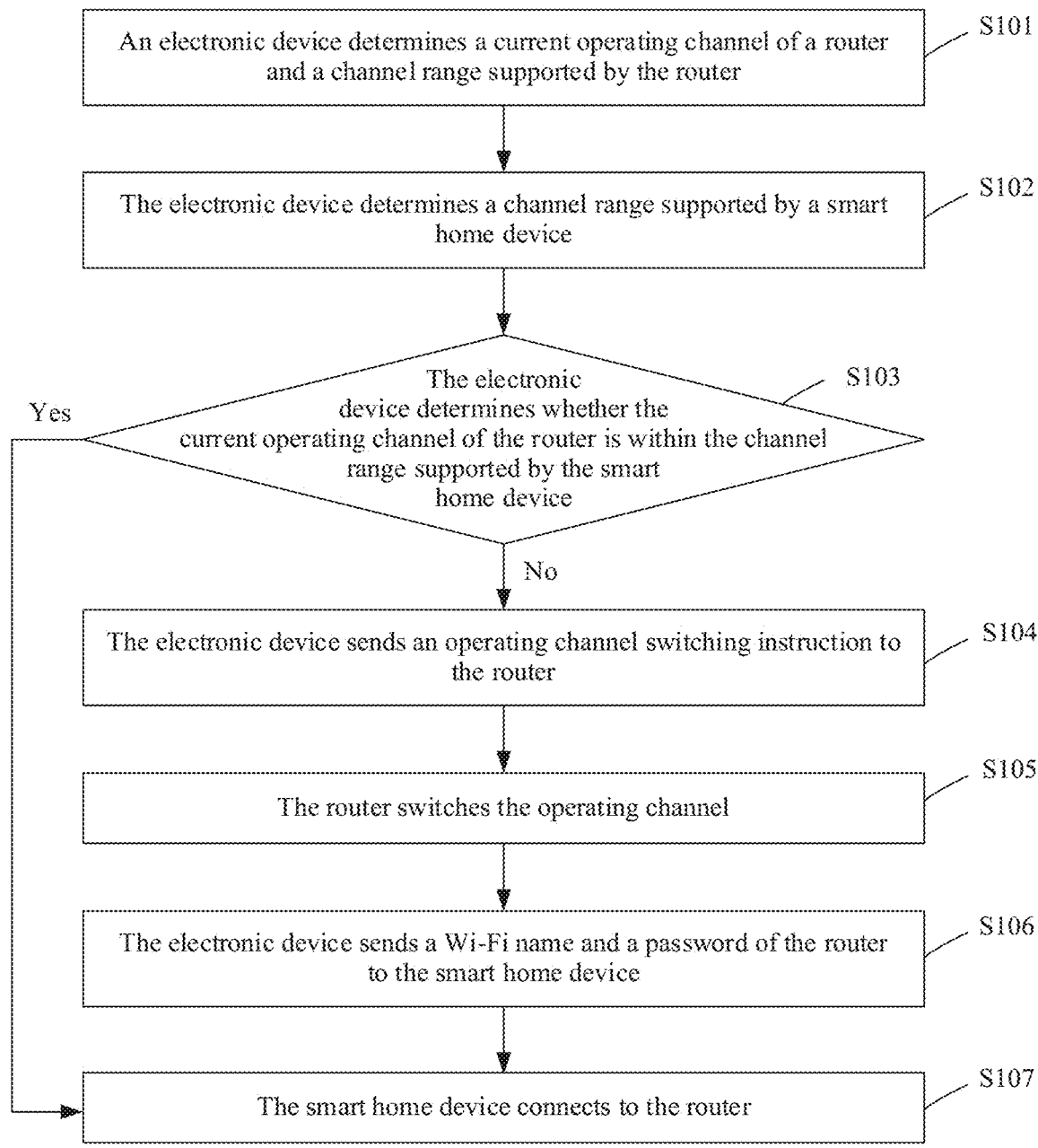
FIG. 10 is a schematic flowchart of a method for accessing a network by a smart home device according to an embodiment of this application.

As shown in FIG. 10, a method for accessing a network by a smart home device may include at least the following several steps:

S101. An electronic device determines an operating channel of a router and a channel range supported by the router.

S102. The electronic device determines a channel range supported by the smart home device.

S103. The electronic device determines whether the operating channel of the router is within the channel range supported by the smart home device; if yes, performs S106; and if no, performs S104.

S104. The electronic device sends an operating channel switching instruction to the router.

S105. The router switches the operating channel.

S106. The electronic device sends a Wi-Fi name and a password of the router to the smart home device.

S107. The smart home device connects to the router.

An electronic device 100 determines an operating channel of a router 200 and a channel range supported by the router 200 in the following several implementations:

In a possible implementation, the electronic device 100 may determine, by using a beacon frame broadcast by the router 200, the operating channel of the router 200 and the channel range supported by the router 200.

Specifically, the router 200 operates in an AP mode, and broadcasts a beacon frame to surrounding devices on operating channel X of the router 200 at a specific period. A sending period of the beacon frame may be, for example, 100 milliseconds or 200 milliseconds. A longer sending period of the beacon frame indicates a longer sleep period of the router 200, and that more energy is saved. A smaller sending period of the beacon frame indicates that a shorter time is consumed by the device to find the router.

After enabling a WLAN, the electronic device 100 may perform polling in a channel range supported by the electronic device 100, and receive, on channel X, the beacon frame broadcast by the router 200. The electronic device 100 may determine that channel X on which the beacon frame is received is the operating channel of the router 200. For a manner in which the electronic device 100 enables the WLAN, refer to the description in the embodiment in FIG. 6.

For example, it is assumed that the channel range supported by the electronic device 100 is channel 1 to channel 13. After enabling the WLAN, the electronic device 100 may sequentially scan, starting from channel 1, each channel for the beacon frame broadcast by the router 200, and it may be determined that channel X is the operating channel of the router 200 after the beacon frame broadcast by the router 200 is received on channel X (X may be, for example, 12 or 13). A process in which the electronic device 100 sequentially scans each channel for the beacon frame broadcast by the router 200 may be referred to as polling.

The electronic device 100 may determine, by using a country field of the beacon frame, the channel range supported by the router 200.

For example, a format of the country field is shown in FIG. 11. The country field may carry at least information such as an element ID (element ID), a length (length), a country code (country string), a first channel number (first channel number), the number of channels (number of channels), and a maximum transmit power (maximum transmit power).

The element ID is an identifier of the country field. The electronic device 100 may determine, based on the element ID, whether the field is a country field. Generally, the element ID of the country field is 7.

The length indicates the number of bytes in content of the country field (excluding a length occupied by the element ID and the length).

The country code is used to represent a country to which the device is applicable, and different countries correspond to different available channels. The first channel number is used to represent a number of the first channel supported by the device. The number of channels is used to represent the number of channels supported by the device. The maximum transmit power is used to represent a maximum power of the device when the device transmits signals. Different countries correspond to different available bands, including the number of the first channel and the number of supported channels. Different countries further correspond to different maximum transmit powers. A channel range supported by the device can be learned from the number of the first channel and the number of supported channels.

FIG. 12 shows an example of correspondences between different countries and a country code, a first channel number, number of channels, and a supported channel range in a 2.4 GHz band range.

It is assumed that the router 200 in the embodiments of this application is a router applicable to China, and the smart home device 300 in the embodiments of this application is a smart home device applicable to the United States.

It can be learned from FIG. 12 that the router 200 applicable to China may operate on any one of channel 1 to channel 13, and a channel range supported by the smart home device 300 applicable to the United States is [1, 11]. When the router 200 operates on channel 12 or channel 13, the smart home device 300 cannot connect to the router 200.

Specifically, the electronic device 100 may determine, based on the country code in the country field, the channel range supported by the router 200. For example, if the country code is CN, it may be determined that the channel range supported by the router is [1, 13]. If the country code is US, it may be determined that the channel range supported by the router is [1, 11]. If the country code is JP, it may be determined that the channel range supported by the router is [1, 14]. If the country code is IL, it may be determined that the channel range supported by the router is [3, 9].

Specifically, the electronic device 100 may further determine, based on the first channel number and the number of channels, the channel range supported by the router 200. For example, if the first channel number is 1 and the number of channels is 13, it may be determined that the channel range supported by the router is [1, 13]. If the first channel number is 3 and the number of channels is 7, it may be determined that the channel range supported by the router 200 is [3, 9].

In another possible implementation, the electronic device 100 may determine, by using a probe response frame sent by the router 200, the operating channel of the router 200 and the channel range supported by the router.

Specifically, after enabling the WLAN, the electronic device 100 may sequentially broadcast a probe request frame on each channel supported by the electronic device 100. After receiving the probe request frame on channel X, the router 200 may send a probe response frame to the electronic device 100 on channel X. The electronic device 100 may perform polling in the channel range supported by the electronic device 100 until receiving, on channel X, the probe response frame sent by the router 200. The electronic device 100 may determine that channel X on which the probe response frame is received is the operating channel of the router 200. For a manner in which the electronic device 100 enables the WLAN, refer to the description in the embodiment in FIG. 6.

The electronic device 100 may determine, by using a country field of the probe response frame, the channel range supported by the router 200. A format of the country field of the probe response frame is similar to the format of the country field of the beacon frame. Details are not described herein again.

Not limited to the country field in the beacon frame or the probe response frame, the electronic device 100 may further determine, by using a vendor specific field in the beacon frame or the probe response frame, the channel range supported by the router 200. The vendor specific field may include at least a country code, or the vendor specific field may include a first channel number and the number of channels, or the vendor specific field may include a country code, a first channel number, and the number of channels. The format of the vendor specific field may be defined by vendors.

After receiving, on channel X, the beacon frame or the probe response frame sent by the router 200, the electronic device 100 can connect to the router 200, There may be two different cases in which the electronic device 100 connects to the router 200. For a connection manner in each case, refer to the description in the foregoing embodiment. Details are not described herein again.

The following describes how the electronic device determines the channel range supported by the smart home device.

Specifically, the electronic device 100 may determine, by using a beacon broadcast by the smart home device 300, the channel range supported by the smart home device 300.

Specifically, the current operating mode of the smart home device 300 is an AP mode, and the beacon frame is broadcast to surrounding devices on channel Y at a specific period. A sending period of the beacon frame is similar to the sending period of the beacon frame broadcast by the router 200. Details are not described herein again.

The following separately describes, in two cases, how the electronic device receives a beacon broadcast by the smart home device.

Case 1: If the electronic device 100 has been connected to the router 200, the electronic device 100 may sequentially scan each channel at a specific time interval, and return to channel X each time a channel is scanned, until the beacon frame sent by the smart home device 300 is scanned on channel Y. It is ensured that data transmission between the electronic device 100 and the router 200 is not affected during scanning of the smart home device 300. The time interval may be, for example, 100 milliseconds or 200 milliseconds.

Case 2: If the electronic device 100 has not been connected to the router 200, the electronic device 100 may perform polling in the channel range supported by the electronic device 100 until receiving, on channel Y, the beacon frame broadcast by the smart home device 300.

Specifically, before the electronic device 100 scans the beacon of the smart home device 300, the electronic device 100 may further receive a device adding instruction input by the user. The user may input the device adding instruction by tapping the device adding control 801 in the embodiment in FIG. 8.

After receiving the beacon frame broadcast by the smart home device 300, the electronic device 100 may determine, by using the country field of the beacon frame, the channel range supported by the smart home device 300. For the format of the country field, refer to the related description in the embodiment in FIG. 11. Details are not described herein again.

Not limited to the beacon frame, in another implementation, the electronic device 100 may further determine, by using the probe response frame, the channel range supported by the smart home device 300. A process of determining, by using the probe response frame, the channel range supported by the smart home device 300 is similar to the process of determining, by using the probe response frame, the channel range supported by the router 200 in the foregoing embodiment. Details are not described herein again.

Not limited to the country field, in another implementation, the electronic device 100 may further determine, by using the vendor specific field in the beacon frame or the probe response frame, the channel range supported by the smart home device 300. A process of determining, by using the vendor specific field, the channel range supported by the smart home device 300 is similar to the process of determining, by using the vendor specific field, the channel range supported by the router 200 in the foregoing embodiment. Details are not described herein again.

In a possible implementation, after the electronic device 100 determines that the operating channel of the router 200 is not within the channel range supported by the smart home device 300, the electronic device 100 may send an operating channel switching instruction to the router 200. The operating channel switching instruction may carry the channel range supported by the smart home device 300.

In another possible implementation, after the electronic device 100 determines that the operating channel of the router 200 is not within the channel range supported by the smart home device 300, the electronic device 100 may send, to the router 200, an operating channel switching instruction and information that carries the channel range supported by the smart home device 300.

The router 200 may select, from the channel range supported by the smart home device 300 and the channel range supported by the router 200, a channel with relatively good channel quality as a new operating channel, for example, channel M. The channel quality may be measured by using a signal-to-noise ratio. A higher signal-to-noise ratio indicates better channel quality.

In addition, the router 200 may record the channel range supported by the smart home device 300, to ensure that an operating channel selected after the router 200 is restarted next time is within the channel range supported by the smart home device 200, so that the smart home device 300 can quickly access a network.

The following describes how the electronic device sends the Wi-Fi name and the password of the router to the smart home device.

In a possible implementation, the electronic device 100 can connect to the smart home device 300, and send the Wi-Fi name and the password of the router 200 to the smart home device 300 on channel Y. A manner in which the electronic device 100 connects to the smart home device 300 may be that the user taps the option 6022 in the embodiment in FIG. 6. A manner in which the electronic device 100 connects to the smart home device 300 may alternatively be that the user taps the option 901 in the embodiment in FIG. 9.

In another possible implementation, the electronic device 100 does not connect to the smart home device 300, and the electronic device 100 may sequentially broadcast, on each channel supported by the electronic device 100, a data frame that carries the Wi-Fi name and the password of the router 200. The smart home device 300 may sequentially perform polling on each channel supported by the smart home device 300 until receiving, on a channel, the Wi-Fi name and the password of the router 200 that are broadcast by the electronic device 100. The data frame broadcast by the electronic device 100 may further carry identification information of the smart home device 300, and the identification information may be, for example, a MAC address or a hotspot name of the smart home device 300 when the smart home device 300 operates in an AP mode. The identification information may be carried in the beacon frame broadcast by the smart home device 300. After receiving the data broadcast by the electronic device 100, the smart home device 300 may determine whether the identification information carried in the data frame is consistent with the identification information of the smart home device 300, and if the identification information carried in the data frame is consistent with the identification information of the smart home device 300, obtain the Wi-Fi name and the password of the router 200 that are carried in the data frame. It can be learned that the data frame that carries the Wi-Fi name and the password of the router 200 may be a plurality of frames.

In another possible implementation, the electronic device 100 may send the Wi-Fi name and the password of the router 200 to the smart home device 300 by using a near field communication (near field communication, NFC) technology, Bluetooth, a Wi-Fi direct connection port, or the like.

After receiving the Wi-Fi name and the password of the router 200, the smart home device 300 switches the operating mode from the AP mode to the STA mode, performs polling in the channel range supported by the smart home device 300, and searches for a router 200 whose Wi-Fi name is consistent with the Wi-Fi name of the router 200. The smart home device 300 may receive, on channel M, the beacon frame sent by the router 200 whose Wi-Fi name is consistent with the Wi-Fi name. The password is then sent to the router 200 on channel M. The router 200 may verify whether the password sent by the smart home device 300 is correct. If the password is correct, the smart home device 300 connects to the router 200 successfully.

In another possible embodiment, S106 may be implemented before S103 to S105. If the electronic device 100 determines that the operating channel of the router 200 is within the channel range supported by the smart home device 300, the smart home device 300 may directly connect to the router 200 to access a network. If the current operating channel of the router 200 is not within the channel range supported by the smart home device 300, after the smart home device 300 receives the name and the password of the router 200 that are sent by the electronic device 100, when polling is performed within the channel range supported by the smart home device 300, the router 200 whose Wi-Fi name is consistent with the Wi-Fi name of the router 200 cannot be found until the router 200 switches the operating channel to the channel range supported by the smart home device 300.

In this embodiment of this application, the electronic device 100 may determine whether the operating channel of the router 200 is within the channel range supported by the smart device 300, and if the operating channel is not within the channel range supported by the smart device 300, send an operating channel switching instruction to the router 200, so that an operating channel obtained through switching is within the channel range supported by the smart home device 300. In this way, the smart home device 300 can quickly connect to a network without affecting user experience.

An embodiment in FIG. 1 of this application provides a smart home system. An electronic device 100 in the smart home system may be configured to perform all or some of the steps performed by the electronic device 100 in the embodiment in FIG. 10. The router 200 in the smart home system may be configured to perform all or some of the steps performed by the router 200 in the embodiment in FIG. 10. The smart home device 300 in the smart home system may be configured to perform all or some of the steps performed by the smart home device 300 in the embodiment in FIG. 10.

An embodiment of this application provides a specific method for accessing a network by a smart home device.

Figure 13:
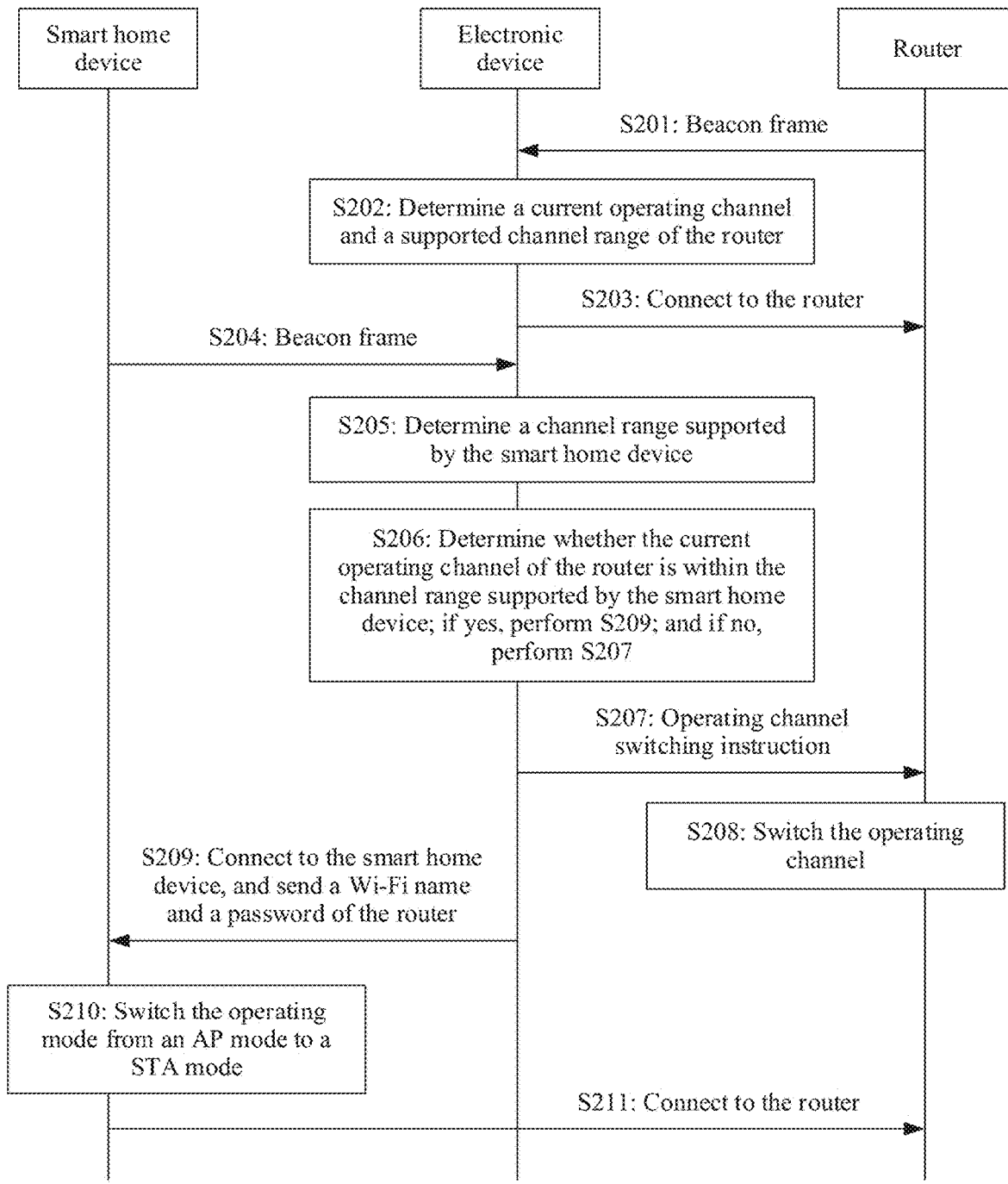
FIG. 13 is a schematic flowchart of another method for accessing a network by a smart home device according to an embodiment of this application.

As shown in FIG. 13, a method for accessing a network by a smart home device may include at least the following several steps.

S201, A router broadcasts a beacon frame.

Specifically, the router 200 may broadcast the beacon frame on channel X at a specific period.

S202. An electronic device determines a current operating channel of the router and a channel range supported by the router.

Specifically, after enabling a WLAN, the electronic device 100 may perform polling in a channel range supported by the electronic device 100, and receive, on channel X, the beacon frame broadcast by the router 200. The electronic device 100 may determine that the channel on which the beacon frame is received is the operating channel of the router 200; and determine, based on a country field of the beacon frame, the channel range supported by the router 200.

S203. The electronic device connects to the router.

In a possible embodiment, the electronic device 100 has been once connected to the router 200, and the electronic device 100 may automatically connect to the router 200 after receiving, on channel X, the beacon frame broadcast by the router 200.

In another possible embodiment, the electronic device 100 has never been connected to the router 200, and can connect to the router 200 after the user enters a correct password. Possibly, the electronic device 100 may not connect to the router 200.

S204, The smart home device broadcasts a beacon frame.

Specifically, the smart home device 300 operates in an AP mode, and broadcasts the beacon frame on channel Y at a specific period.

S205. The electronic device determines a channel range supported by the smart home device.

Specifically, after the electronic device 100 receives a device adding instruction entered by the user (for example, the user taps the device adding control 801 in the embodiment in FIG. 8), the electronic device 100 may sequentially scan each channel at a specific time interval, and each time a channel is scanned, the electronic device 100 returns to channel X to connect to the router 200, until the beacon frame sent by the smart home device 300 is scanned on channel Y.

S206, The electronic device determines whether the current operating channel of the router is within the channel range supported by the smart home device; if yes, performs S209; and if no, performs S207.

S207. The electronic device sends an operating channel switching instruction to the router.

Specifically, the operating channel switching instruction may carry the channel range supported by the smart home device 300. The router 200 may select, based on the channel range supported by the router 200 and the channel range supported by the smart home device 300, a channel with relatively good channel quality as a new operating channel, for example, channel M.

S208. The router switches the operating channel.

Specifically, after switching the operating channel to channel M, the router 200 broadcasts the beacon frame to surrounding devices on channel M at a specific period, and waits for device access.

S209. The electronic device connects to the smart home device, and sends a Wi-Fi name and a password of the router.

Specifically, the electronic device 100 disconnects from the router 200, and connects to the smart home device 300. A manner in which the electronic device 100 connects to the smart home device 300 may be that the user taps the option 6022 in the embodiment in FIG. 6, or the user taps the option 901 in the embodiment in FIG. 9.

In a possible embodiment, the electronic device 100 does not connect to the router 200. When sending the Wi-Fi name and the password of the router to the smart home device 300, the electronic device 100 may directly select a target router in the user interface 70 shown in FIG. 7 and enter the password of the router.

In another possible embodiment, the electronic device 100 may not connect to the smart home device 200, and the electronic device 100 may send the Wi-Fi name and the password of the router 200 to the smart home device 300 in a multicast or broadcast manner. For a specific sending process, refer to part of the related description about how the electronic device sends the Wi-Fi name and the password of the router to the smart home device described in the foregoing embodiment. Details are not described herein again.

S210. The smart home device switches the operating mode from an AP mode to a STA mode.

Specifically, after receiving the Wi-Fi name and the password of the router 200, the smart home device 300 switches the operating mode from the AP mode to the STA mode, performs polling in the channel range supported by the smart home device 300, and searches for a router whose Wi-Fi name is consistent with the received Wi-Fi name.

S211. The smart home device connects to the router.

Specifically, the smart home device 300 may receive, on channel M, a beacon frame broadcast by the router 200, where the beacon frame may carry a Wi-Fi name (SSID) of the router 200. After finding the router 200, the smart home device 300 sends the password to the router 200 on channel M. The router 200 may determine whether the password sent by the smart home device 300 is correct, and if the password is correct, access of the smart home device 300 is allowed. In this case, the smart home device 300 connects to the router 200 successfully, and the smart home device 300 accesses a network successfully.

An embodiment in FIG. 1 of this application provides a smart home system. An electronic device 100 in the smart home system may be configured to perform all or some of the steps performed by the electronic device 100 in the embodiment in FIG. 11. The router 200 in the smart home system may be configured to perform all or some of the steps performed by the router 200 in the embodiment in FIG. 11. The smart home device 300 in the smart home system may be configured to perform all or some of the steps performed by the smart home device 300 in the embodiment in FIG. 11.

Not limited to sending the channel switching instruction to the router 200, the electronic device 100 may further send a channel range extension instruction to the smart home device 300.

Figure 14:
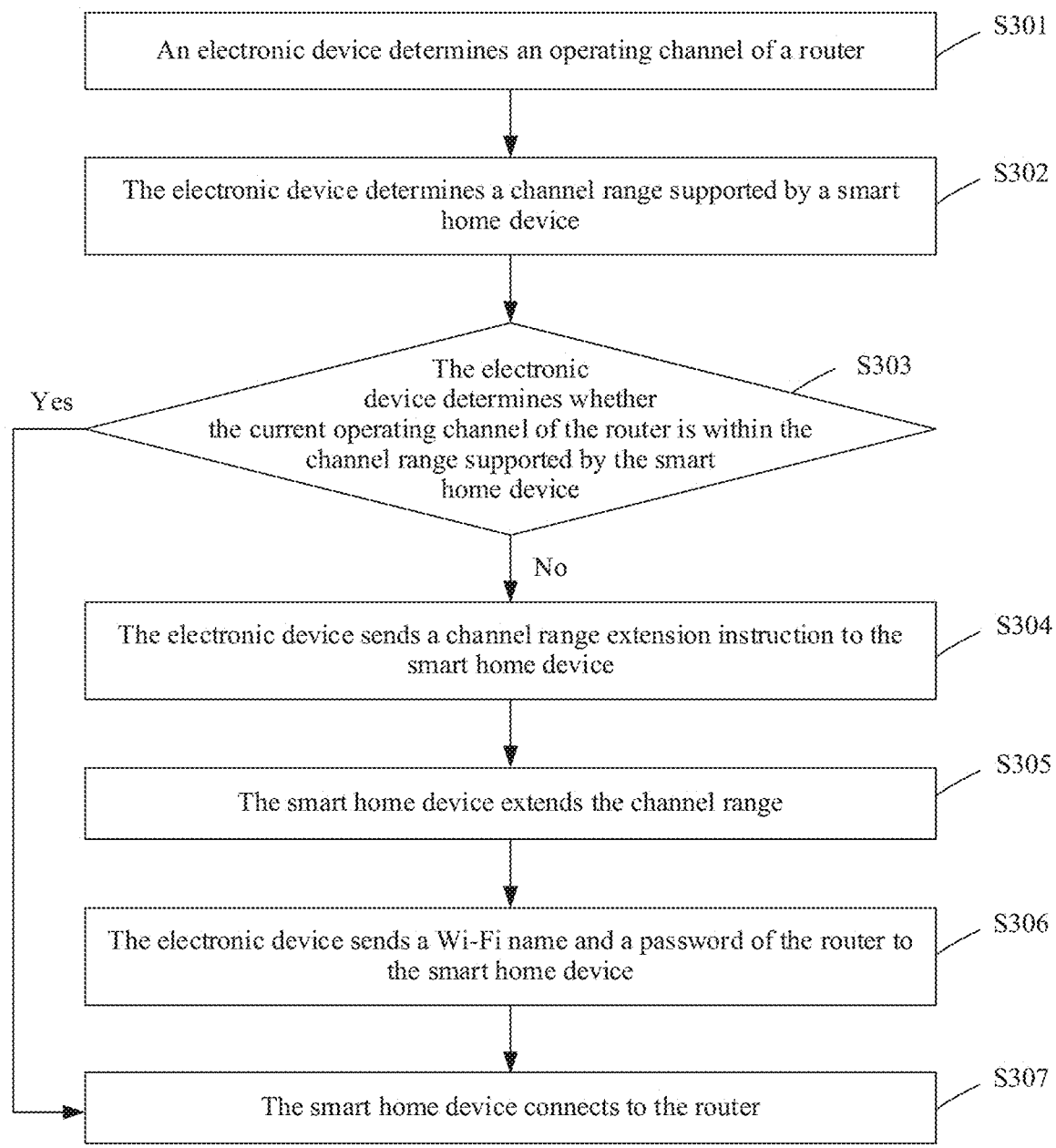
FIG. 14 is a schematic flowchart of another method for accessing a network by a smart home device according to an embodiment of this application.

Specifically, as shown in FIG. 14, a method for accessing a network by a smart home device may include at least the following several steps:

S301. An electronic device determines an operating channel of a router.

S302. The electronic device determines a channel range supported by the smart home device.

S303. The electronic device determines whether the operating channel of the router is within the channel range supported by the smart home device; if yes, performs S306; and if no, performs S304.

S304. The electronic device sends a channel range extension instruction to the smart home device.

S305. The smart home device extends the channel range.

S306, The electronic device sends a name and a password of the router to the smart home device.

S307, The smart home device connects to the router.

Specifically, an implementation in which the electronic device 100 determines the operating channel of the router 200 is consistent with the implementation described in the embodiment in FIG. 10. Details are not described herein again.

Specifically, an implementation in which the electronic device 100 determines the channel range supported by the smart home device 300 is consistent with the implementation described in the embodiment in FIG. 10. Details are not described herein again.

When the electronic device 100 determines that the operating channel of the router 200 is not within the channel range supported by the smart home device 300, the electronic device 100 sends the channel range extension instruction to the smart home device 300. The channel range extension instruction may carry the operating channel of the router 200.

After receiving the channel range extension instruction sent by the electronic device 100, the smart home device 300 extends the channel range supported by the smart home device 300 to a channel range that may include the operating channel of the router 200.

In a possible implementation, the smart home device 300 may extend the channel range supported by the smart home device 300 to the channel range supported by the router 200. The electronic device 100 may determine the channel range supported by the router 200. A specific implementation is the same as that described in the embodiment in FIG. 10. Details are not described herein again.

For example, if the channel range supported by the smart home device 300 is [1, 11], and the channel range supported by the router 300 is [1,13], the channel range supported by the smart home device 300 needs to be extended from [1, 11] to [1, 13].

Specifically, the channel range extension instruction sent by the electronic device 100 to the smart home device 300 may carry a country code (for example, CN) and a channel range (for example, channel 1 to channel 13) that are supported by the router 200. After receiving the channel extension instruction, the smart home device 300 changes a country code of the smart home device 300 to the country code (for example, CN) supported by the router 200, and changes a channel range supported by the smart home device 300 to the channel range (for example, channel 1 to channel 13) supported by the router 200.

Specifically, for an implementation in which the electronic device 100 sends the Wi-Fi name and the password of the router 200 to the smart home device 300, refer to the related description in the embodiment in FIG. 10. Details are not described herein again.

In this embodiment of this application, the electronic device 100 may determine whether the operating channel of the router 200 is within the channel range supported by the smart device 300, and if the operating channel of the router 200 is not within the channel range supported by the smart device 300, send a channel extension instruction to the smart home device 300, so that the smart home device 300 after channel extension may establish a connection to the router 200. In this way, the smart home device 300 can quickly connect to a network without affecting user experience.

An embodiment in FIG. 1 of this application provides a smart home system. An electronic device 100 in the smart home system may be configured to perform all or some of the steps performed by the electronic device 100 in the embodiment in FIG. 12. The router 200 in the smart home system may be configured to perform all or some of the steps performed by the router 200 in the embodiment in FIG. 12. The smart home device 300 in the smart home system may be configured to perform all or some of the steps performed by the smart home device 300 in the embodiment in FIG. 12.

An embodiment of this application further provides a computer readable storage medium. All or some of the procedures in the foregoing method embodiments may be completed by a computer program instructing related hardware. The program may be stored in the foregoing computer storage medium. When the program is executed, the procedures in the foregoing method embodiments may be included. The computer readable storage medium includes: any medium that can store program code, such as a read-only memory (read-only memory, ROM), a random access memory (random access memory, RAM), a magnetic disk, or an optical disc.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instruction may be stored in a computer readable storage medium, or may be transmitted by using the computer readable storage medium. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

A sequence of the steps of the method in the embodiments of this application may be adjusted, combined, or removed based on an actual requirement.

The modules in the apparatus in the embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. An electronic device, comprising:
    one or more processors; and
    a memory coupled to the one or more processors and configured to store computer-executable instructions that, when executed by the one or more processors, cause the electronic device to:
    receive an operating channel of a router;
    receive a beacon frame from the router, wherein a channel for receiving the beacon frame is the operating channel;
    learn, based on a country field or a vendor-specific field in the beacon frame, a first channel range supported by the router;
    learn a second channel range supported by a smart home device;
    send an operating channel switching instruction to the router when the operating channel is not within the second channel range, wherein the operating channel switching instruction carries the second channel range; and
    send a WI-FI name and a password of the router to the smart home device.

2. The electronic device of claim 1, wherein the instructions further cause the electronic device to:
    receive a second beacon frame from the smart home device; and
    learn the second channel range based on a second country field or a second vendor-specific field in the second beacon frame.

3. The electronic device of claim 1, wherein the instructions further cause the electronic device to:
    receive a probe response frame from the smart home device; and
    learn the second channel range based on a second country field or a second vendor-specific field in the probe response frame.

4. The electronic device of claim 1, wherein before sending the WI-FI name and the password of the router to the smart home device, the instructions further cause the one or more processors to connect to the smart home device.

5. The electronic device of claim 1, wherein the instructions further cause the one or more processors to sequentially broadcast, on each channel supported by the electronic device, information about the WI-FI name and the password, and wherein the information carries identification information of the smart home device.

6. The electronic device of claim 1, wherein the WI-FI name and the password are sent in a data frame.

7. The electronic device of claim 1, wherein the country field includes a first channel number and a number of channels to indicate the first channel range.

8. The electronic device of claim 1, wherein the country field includes a maximum transmit power.

9. The electronic device of claim 1, wherein a country code in the country field indicates the first channel range.

10. A smart home system, comprising:
    an electronic device configured to:
    receive an operating channel of a router;
    learn a first channel range supported by the router;
    receive a beacon frame from a smart home device;
    learn, based on a country field or a vendor specific field in the beacon frame, a second channel range supported by the smart home device;
    send an operating channel switching instruction to the router when the operating channel is not within the second channel range, wherein the operating channel switching instruction carries the second channel range; and
    send a WI-FI name and a password of the router to the smart home device;
    the router configured to:
    receive the operating channel switching instruction; and
    switch the operating channel to a second operating channel, wherein the second operating channel is within the first channel range and the second channel range; and
    the smart home device configured to connect to the router by using the WI-FI name and the password.

11. The smart home system of claim 10, wherein the electronic device is further configured to:
receive a second beacon frame from the router, wherein a channel for receiving the second beacon frame is the operating channel; and
learn the first channel range based on a second country field or a second vendor specific field in the second beacon frame.

12. The smart home system of claim 10, wherein before the electronic device sends the WI-FI name and the password of the router to the smart home device, the electronic device is further configured to connect to the smart home device.

13. The smart home system of claim 10, wherein the electronic device is further configured to:
receive a probe response frame from the router; and
learn, based on a second country field or a second vendor specific field in the probe response frame, the first channel range.

14. The smart home system of claim 10, wherein the electronic device is further configured to sequentially broadcast, on each channel supported by the electronic device, information about the WI-FI name and the password, wherein the information carries identification information of the smart home device.

15. A method for accessing a network by a smart home device, comprising:
receiving an operating channel of a router;
receiving a probe response frame from the router, wherein a channel for receiving the probe response frame is the operating channel;
learning, based on a country field or a vendor specific field in the probe response frame, a first channel range supported by the router;
learning a second channel range supported by the smart home device;
sending an operating channel switching instruction to the router when the operating channel is not within the second channel range, wherein the operating channel switching instruction carries the second channel range; and
sending a WI-FI name and a password of the router to the smart home device.

16. The method of claim 15, further comprising:
receiving a beacon frame from the smart home device; and
learning the second channel range based on a second country field or a second vendor specific field in the beacon frame.

17. The method of claim 15, further comprising:
receiving a second probe response frame from the smart home device; and
learning the second channel range based on a second country field or a second vendor specific field in the second probe response frame.

18. The method of claim 15, wherein before sending the WI-FI name and the password of the router to the smart home device, the method further comprises connecting to the smart home device.

19. The method of claim 15, further comprising sequentially broadcasting, on each channel supported by an electronic device, information about the WI-FI name and the password, wherein the information carries identification information of the smart home device.

20. The method of claim 15, further comprising:
prior to receiving the operating channel of the router, sequentially broadcasting, on each channel supported by an electronic device, a probe request frame.

* * * * *